United States Patent
Inukai

(10) Patent No.: US 9,300,392 B2
(45) Date of Patent: Mar. 29, 2016

(54) ACQUISITION GUARD TIME REDUCTION USING SINGLE TERMINAL RANGING

(75) Inventor: Tom Inukai, Gaithersburg, MD (US)

(73) Assignee: VIASAT, INC., Carlsbad, CA (US)

( * ) Notice: Subject to any disclaimer, the term of this patent is extended or adjusted under 35 U.S.C. 154(b) by 1245 days.

(21) Appl. No.: 12/784,652

(22) Filed: May 21, 2010

(65) Prior Publication Data

US 2011/0122785 A1    May 26, 2011

Related U.S. Application Data

(60) Provisional application No. 61/180,697, filed on May 22, 2009.

(51) Int. Cl.
| | |
|---|---|
| *H04J 1/16* | (2006.01) |
| *G01S 19/16* | (2010.01) |
| *G01S 19/42* | (2010.01) |
| *H04B 7/212* | (2006.01) |

(52) U.S. Cl.
CPC .................................... *H04B 7/2125* (2013.01)

(58) Field of Classification Search
USPC ............. 370/316, 350, 321, 508; 342/357.31, 342/356; 701/213; 455/13.2, 3.02, 456
See application file for complete search history.

(56) References Cited

U.S. PATENT DOCUMENTS

| | | | |
|---|---|---|---|
| 4,712,212 A | | 12/1987 | Takai et al. |
| 5,463,400 A | | 10/1995 | Tayloe |
| 5,991,280 A | * | 11/1999 | Ichiyoshi ...................... 370/321 |
| 6,539,003 B1 | * | 3/2003 | Agarwal et al. ............... 370/324 |
| 6,701,127 B1 | | 3/2004 | Wreschner et al. |
| 7,187,903 B1 | * | 3/2007 | Febvre et al. ................. 455/13.2 |
| 7,313,401 B2 | * | 12/2007 | Karmel ...................... 455/456.1 |
| 7,432,852 B2 | * | 10/2008 | Monnerat et al. ............. 342/356 |
| 7,505,428 B2 | * | 3/2009 | Kimura ......................... 370/328 |

(Continued)

FOREIGN PATENT DOCUMENTS

WO    WO-2010/135631 A2    11/2010

OTHER PUBLICATIONS

International Search Report and Written Opinion mailed in International Application No. PCT/US2010/035747 on Nov. 23, 2010, 18 pgs.
International Preliminary Report on Patentability mailed in International Application No. PCT/US2010/035747 on Nov. 22, 2011, 13 pgs.
Non-Final Office Action mailed in U.S. Appl. No. 12/784,644 on Mar. 12, 2012, 6 pgs.

(Continued)

*Primary Examiner* — Kevin C Harper
*Assistant Examiner* — Derrick V Rose

(57) ABSTRACT

Embodiments provide systems, devices, and methods for determining acquisition guard times and acquisition control parameters or distance metrics for terminals in a satellite communication network using triangulation and single terminal ranging. A terminal or multiple terminals from the network may be selected as ranging terminals; the terminals may include normal user terminals used for determining a satellite position or a satellite distance. Ranging terminals may first enter a network and synchronize to TDMA frame timing by adjusting the acquisition control parameters. An adjusted acquisition control parameter may also be called a transmit timing control parameter. A satellite position or a distance difference between a real-time and a nominal satellite position may be estimated from timing control parameters. Information about the satellite position and/or the distance difference in satellite position may then be used to reduce acquisition guard times for other terminals using various techniques to compute acquisition control parameters.

35 Claims, 14 Drawing Sheets

(56) References Cited

U.S. PATENT DOCUMENTS 8,032,073 B2* 10/2011 Youssefzadeh et al. ...... 455/3.02
2004/0143392 A1* 7/2004 Kilfeather et al. ............ 701/213
2004/0176099 A1 9/2004 Sahai et al.
2007/0165677 A1* 7/2007 Monnerat et al. ............. 370/509
2008/0043663 A1* 2/2008 Youssefzadeh et al. ...... 370/321

OTHER PUBLICATIONS

PCT Invitation to Pay Additional Fees and Partial Search Report mailed Aug. 23, 2010; International Application No. PCT/US2010/035747, 6 pages.

* cited by examiner

FIG. 13 A-D

ACQUISITION GUARD TIME REDUCTION USING SINGLE TERMINAL RANGING

CROSS-REFERENCES TO RELATED APPLICATIONS

This application is a non-provisional claiming priority benefit of U.S. provisional patent application Ser. No. 61/180,697, filed on May 22, 2009 and entitled "Acquisition Guard Time Reduction Using Triangulation and Single Terminal Ranging," the entire disclosure of which is herein incorporated by reference for all purposes. This application is related to U.S. patent application Ser. No. 12/784,644, filed concurrently with this application and entitled "Acquisition Guard Time Reduction Using Triangulation Ranging," incorporated by reference for all purposes.

BACKGROUND

The present invention is related to satellite communications in general and, more specifically, to determining acquisition guard times for very small aperture terminal (VSAT) networks utilizing a time-division multiple access (TDMA) technique. When a terminal enters a TDMA network, the terminal typically needs to synchronize its transmit timing to a TDMA network frame timing to avoid transmission overlap with existing bursts. Since a terminal may not have precise knowledge of its transmit frame timing, a large guard time (larger than that required during steady-state synchronization) is allocated to the terminal. An acquisition guard time may be based on a worst-case acquisition guard time for a network. This may be computed from the satellite motion as determined by its inclination, east-west drift and eccentricity, and the geographical coverage of a network. In addition, an acquisition control parameter may be computed for each terminal based on the terminal's coordinates and the nominal or approximate satellite position.

While these techniques for determining acquisition guard time may be simple, they may result in a large acquisition guard time, in particular for a large orbit inclination. For example, for a satellite system with global coverage, a typical acquisition guard time may be from 0.5 ms to 35 ms, depending on orbit inclination. In some cases, an acquisition guard time may actually be larger than the frame time.

Acquisition guard time may be reduced by determining a satellite position more accurately, but this generally involves utilizing an external system, such as telemetry, tracking and control (TTC) stations, and satellite operations centers (SOCs). It may be beneficial for there to be new systems and methods, which may be based on internal network functions, to more accurately and/or efficiently determine satellite positions and to compute acquisition control parameters for terminals to reduce acquisition guard time.

BRIEF SUMMARY

Certain embodiments may provide systems, devices, and methods for determining acquisition guard times and acquisition control parameters, which may be referred to as distance metrics, for terminals in a satellite communication network using single terminal ranging. Single terminal ranging may involve choosing one terminal from a number of terminals in a network. The chosen terminal may be designated as a ranging terminal. The location of the ranging terminal may depend on orbit inclination and may be chosen to minimize acquisition guard time. The ranging terminal may enter the network first using an acquisition control parameter, which may be referred to as a distance metric in some embodiments, that may be based on the nominal position of the satellite. The ranging terminal may then adjust the acquisition control parameter to synchronize its transmit timing with the TDMA network frame timing. As in the case of triangulation ranging, the acquisition control parameter after adjustment may be called a transmit timing control parameter in some embodiments. The difference between these two control parameters ($\Delta D_a$) may be used for determining acquisition control parameter values for other terminals in the network. Acquisition control parameters for other terminals may be determined by adding $\Delta D_a$ to the nominal acquisition control parameter for these terminals. Acquisition guard time may also be determined based on single terminal ranging which may involve determining differential range variations between the ranging terminal and other terminals.

Embodiments of single terminal ranging may provide for improved acquisition guard time for networks deployed in a smaller geographic region. The single terminal ranging method may also be used for determining acquisition control parameters for a multi-beam system in which one ranging terminal may be assigned to each beam or a group of adjacent beams. The designation of ranging terminal may be changed at any time to reflect the availability of active terminals and/or to optimize terminal location.

In some embodiments, a method for determining acquisition control information for terminals in a satellite communication network is provided. The method may include identifying a real-time distance metric between a satellite and a first terminal in the satellite communication network. The method may also include determining a difference between the real-time distance metric and a previously determined distance metric between the satellite and the first terminal. The method may also include transmitting information based on the determined difference to at least a second terminal in the satellite communication network.

In some embodiments, a satellite communication system configured to determine a transmission propagation delay for a terminal within the satellite communication system is provided. The system may include multiple terminals within the satellite communication system. The system may also include a control center in communication with at least some of the multiple terminals within the satellite communication system. The control center may be configured to receive a real-time distance metric between a satellite and a first terminal from the plurality of terminals. The control center may be configured to determine a difference between the real-time distance metric and a previously determined distance metric between the satellite and the first terminal. The control center may be configured to transmit information based on the determined difference to at least a second terminal from the plurality of terminals within the satellite communication network satellite.

In some embodiments, a satellite communication control device for a satellite communication network is provided. The satellite communication control device may include a receiver configured to receive a real-time time distance metric between a satellite and a first terminal in a plurality of terminals in the satellite communication network. The satellite communication control device may include a processor configured to determine a difference between the real-time distance metric and a previously determined distance metric between the satellite and the first terminal. The satellite communication control device may include a transmitter configured to transmit information based on the determined difference to at least a second terminal in the satellite communication network.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview: Systems, devices, and methods are described for a novel satellite communication network configured to determine satellite coordinates, calculate distance metrics such as acquisition control parameters for terminals, and set acquisition guard times using triangulation and single terminal ranging.

Figure 1:
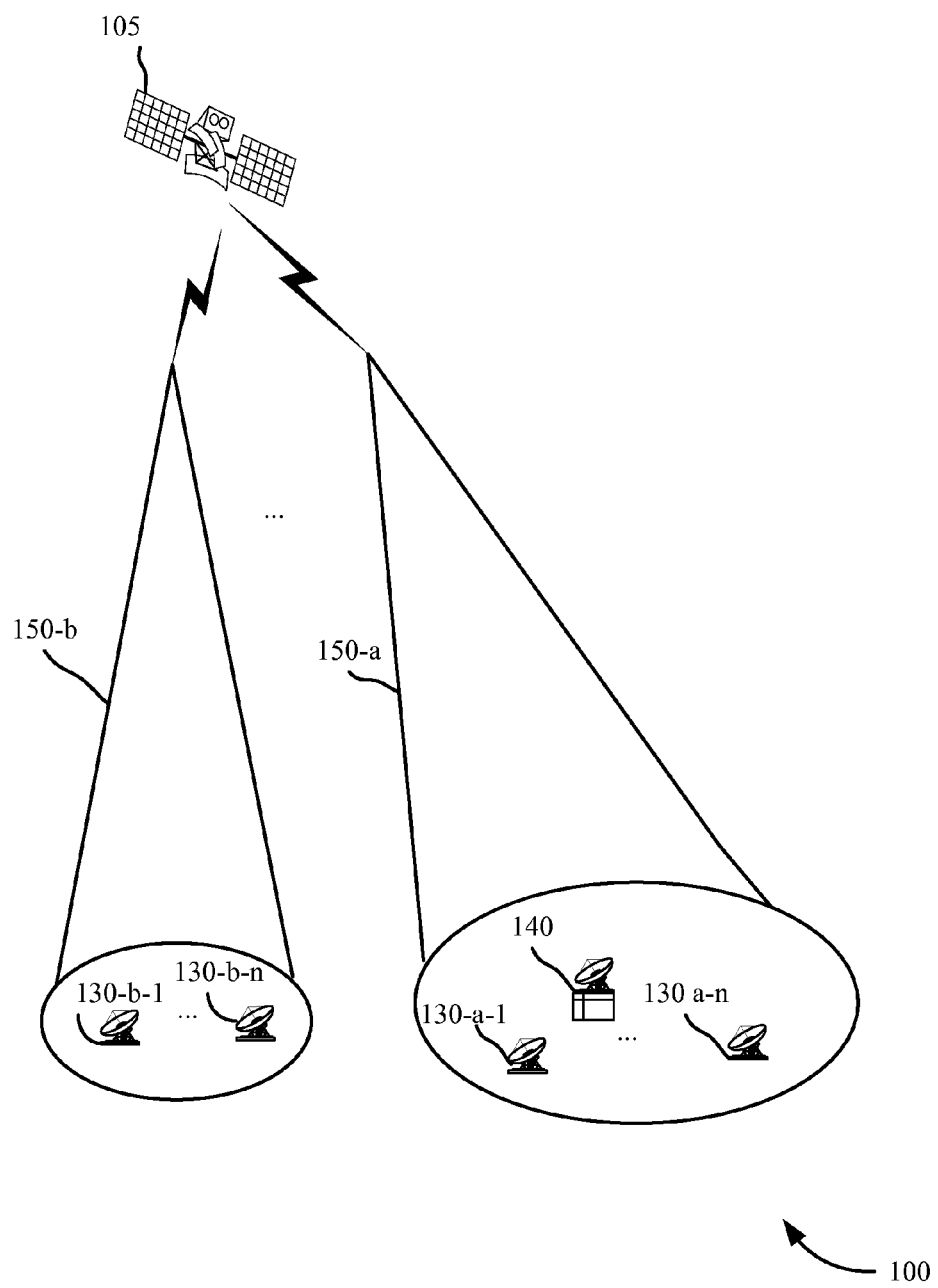
FIG. 1 is a block diagram of a satellite communication system, in accordance with various embodiments.

FIG. 1 is a high-level block diagram illustrating a satellite communication system 100 according to various embodiments of the invention. The system includes a satellite 105 that may provide communications among terminals 130 (e.g., traffic terminals, user terminals, master reference terminals, secondary reference terminals, and/or gateways). In some embodiments, satellite 105 may be in communication possibly with one or more other satellites (not shown).

Satellite 105 may have a single beam or multiple beams. FIG. 1 shows a satellite that includes two or more beams 150-a, 150-b, . . . . Each beam 150 supports a number of terminals 130, and coverage of different beams may be non-overlapping or have varying measures of overlap. Alternatively, a beam may be used for communication with another satellite (not shown) via an inter-satellite link ("ISL"). Satellite 105 may provide connectivity between terminals 130 in the same beam and across beams, as well as to and from beams of other satellites via ISLs. For terminals 130 served by the same satellite 105, there may be full-mesh, partial mesh, or a star, single-hop connectivity between terminals.

In some embodiments, a terminal 130 may be a reference terminal, such as a master reference terminal (not shown). A reference terminal may provide timing and/or synchronization functions for terminals 130. A reference terminal may also provide frequency allocation and network management functions in some embodiments. A reference terminal may transmit reference bursts, which may define a frame clock. Terminals 130 may synchronize themselves to a reference terminal using such reference bursts. Some embodiments may include other reference terminals, such as a secondary reference terminal (not shown). In some embodiments, a secondary reference terminal may provide reference functions when a master reference terminal may be unable to do so. A secondary reference terminal may provide reference timing, frequency allocation, and/or network management for terminals in another beam (e.g., beam 150-b of satellite 105).

A reference terminal may act as a conduit for control center 140, such as a Network Control Center, which may transmit network control messages to terminals 130. NCC may be collocated with a reference terminal in some embodiments. Messages may provide timing and signaling information, which enable over-the-satellite control of a network from an NCC. Terminals 130 and satellite 105 may be managed by an NCC and/or reference terminals. An NCC may include the following functions: a) modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and f) interface with network management and router management. NCC may manage networking timing, synchronization, terminal acquisition, network configuration, and/or bandwidth management. NCC may also act as a Network Management System (NMS) server. An NMS may be a client-server system with a web-based graphical interface. In some embodiments, an NMS client may securely access an NCC server from different locations.

Although the communication system 100 is illustrated as a geostationary satellite-based communication system, it should be noted that various embodiments described herein are not limited to use in geostationary satellite-based systems; for example, some embodiments could be low earth orbit (LEO) or medium earth orbit (MEO) satellite-based systems. Terminals 130 may include, for example, traffic, gateways, or subscriber terminals (sometimes called user terminals). The system 100 may be a star, mesh, or hybrid, and may be implemented in an existing star, mesh, or hybrid system.

One or more computing devices may be connected locally (e.g., a LAN, with wired or wireless connectivity) with a terminal, such as terminal 130, and a connected terminal may be connected to a wider network, as well. Data and information, such as IP datagrams, may be sent from such a connected device through a terminal and the satellite 105, and to another terminal 130 (or other satellite 105). A variety of physical layer transmission modulation and coding techniques may be used on links between the satellite 105 and a terminal, including those defined with the DVB-S2 and WiMAX standards. Different multiplexing schemes may be used as well for various transmissions, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art. In various embodiments, the physical layer techniques may be the same, or different, for downstream and upstream links between the satellite 105 and a terminal 130 (or other satellite). In one embodiment, the system 100 will support binary phase shift keying (BPSK) and quadrature phase shift keying (QPSK) modulations and Viterbi and Reed-Solomon forward error correction (FEC). The system may additionally support other types of modulation schemes, including but not limited to 8-PSK, 16-APSK, and 32-APSK with Turbo or low density parity check (LDPC) coding.

Figure 2:
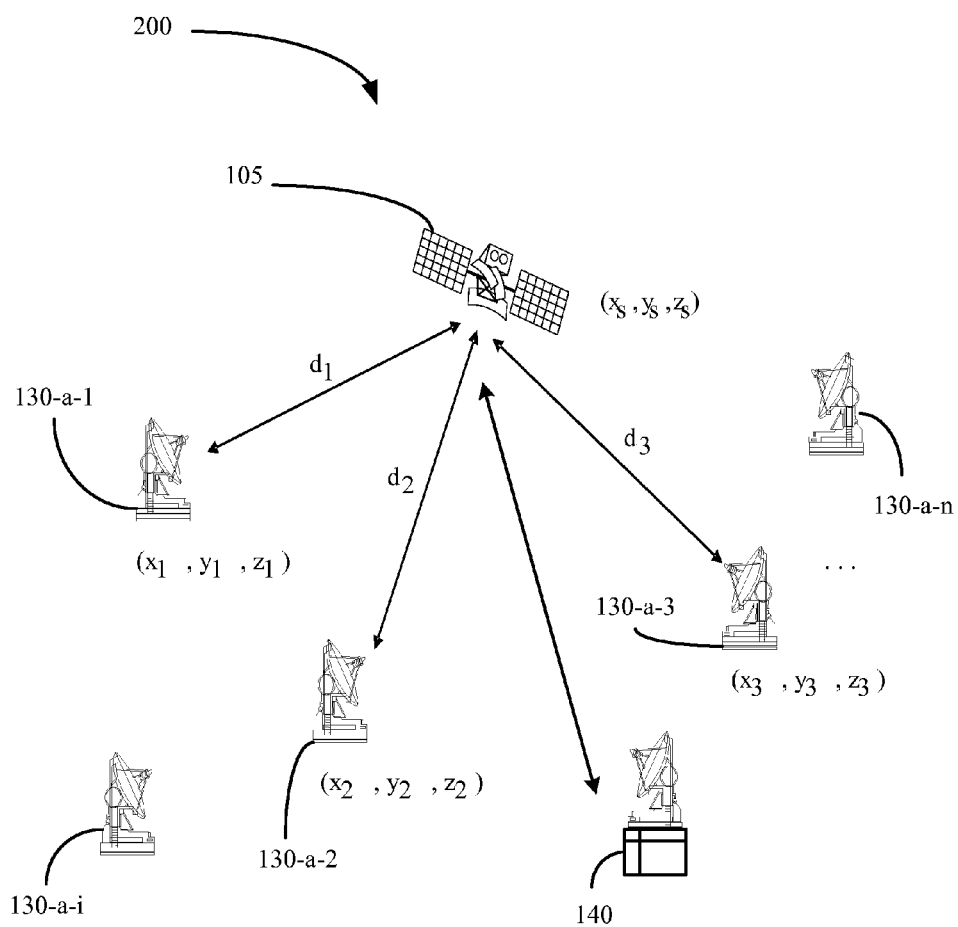
FIG. 2 is a block diagram of a satellite communication system involving triangulation ranging, in accordance with various embodiments.

II. Triangulation Ranging: FIG. 2 is a block diagram of a system 200 for determining distance metrics in general, and more specifically, satellite positions, acquisition control parameters for terminals, and acquisition guard times using triangulation ranging for satellite communication systems or networks. System 200 may be an example of system 100 of FIG. 1.

System 200 shows a number of terminals 130-$a$-1 to 130-$a$-$n$ and satellite 105. Terminals 130 may include reference terminals (not shown). System 200 also shows a control center 140 that may be in communication with some or all of the terminals 130 and satellite 105. In some embodiments, control center 140 may be a Network Control Center. Control center 140 may be integrated into a terminal such as terminal 130-$a$-1 in some embodiments. Control center 140 may also be integrated into satellite 105 in some embodiments.

In the illustrated embodiment, the terminals used for the triangulation ranging are within the same beam, but in other embodiments terminals from different beams may be used. At least three terminals (designated 130-$a$-1, 130-$a$-2, and 130-$a$-3 in this example) may be selected (they may be pre-selected or chosen dynamically). In some embodiments, control center 140 may select the terminals. Each terminal may have coordinates, such as $(x_i, y_i, z_i)$ where i=1, 2, and 3. These coordinates may be known or may be determined in different ways. Merely by way of example, coordinates may be determined using GPS information. In some embodiments, coordinates for terminals may be determined using equations such as the following:

$$x = (C+h)\cos(\theta)\cos(\phi)$$

$$y = (C+h)\cos(\theta)\sin(\phi)$$

$$z = [C(1-f)^2 + h]\sin(\theta)$$

where $\theta$ is a terminal latitude, $\phi$ is a terminal longitude, h is a height above sea level, r is an earth radius, and f is an earth oblateness, which may equal 1/298.23, and $$C = \frac{r_e}{\sqrt{1-f(2-f)\sin^2\theta}}.$$

A satellite position $(x_s, y_s, z_s)$ may then be determined based on distances $d_1$, $d_2$, and $d_3$ between each terminals 130-$a$-1, 130-$a$-2, and 130-$a$-3 and satellite 105. Distances between each terminal 130-$a$-1, 130-$a$-2, and 130-$a$-3 and satellite 105 may be determined by each respective terminal and/or control center 140. Distances may be determined using a variety of distance metrics such as an interval of time between a start of transmit frame (SOTF) and a start of receive frame (SORF) for a respective terminal, a transmission propagation delay for a respective terminal, or a distance between the respective terminal and the determined position of the satellite. In some embodiments, the satellite position may be determined at control center 140. The determined satellite position may be transmitted to terminals 130. Equations such as the following may be used to determine a satellites coordinates:

$$(x_s-x_1)^2+(y_s-y_1)^2+(z_s-z_1)^2=d_1^2$$

$$(x_s-x_2)^2+(y_s-y_2)^2+(z_s-z_2)^2=d_2^2$$

$$(x_s-x_3)^2+(y_s-y_3)^2+(z_s-z_3)^2=d_3^2$$

As will be discussed in more detail below, different techniques for triangulation ranging may be utilized to make these measurements using existing terminals within a satellite communication system such as systems 100 and 200. Along with determining satellite position accurately, which may be updated periodically, acquisition control information such as acquisition control parameters and acquisition guard times may be determined for individual terminals and the satellite communication system, which may also be referred to as a satellite communication network herein.

For example, satellite communication system 200 may be configured to determine positions of satellite 105 and acquisition control information for terminals 130 within the satellite communication system 130. Satellite communication system 200 may include control center 140 that may be in communication with at least a subset of terminals 130. Control center 140 may be configured to receive distance metrics between satellite 105 and each of three or more of the plurality of terminals 130, such as 130-$a$-1, 130-$a$-2, and 130-$a$-3, merely by way of example. Control center 140 may determine a position of satellite 105 based on the plurality of distance metrics. Control center 140 may transmit at least the determined position of the satellite or a distance metric based on the determined position of satellite 105 to at least one terminal from the plurality of terminals 130, such as 130-$a$-$n$, merely by way of example.

In some embodiments, terminals 130 may be configured to receive determined satellite positions transmitted from control center 140. Terminals 130 may determine distance metrics based on the determined position of the satellite and a position of the at least one terminal from the plurality of terminals. Such distance metrics may be represented in different ways, such an interval of time between a start of transmit frame (SOTF) and a start of receive frame (SORF) for the respective terminal, a transmission propagation delay for the respective terminal, or a distance between the respective terminal and the determined position of the satellite.

Control center 140 may update and determine satellite positions on a frequent basis. For example, control center 140 may be configured to update the determined position of the satellite, wherein a frequency of updating depends on the orbit inclination angle of the satellite. In some embodiments, control center 140 may also receive distance metrics from different terminals 130 based on the availability of a terminal to provide distance metric information to control center 140.

Control center 140 may also determine an acquisition guard time of at least one terminal from the plurality of terminals 130 within the satellite communication system using the determined position of the satellite. In some embodiments, individual terminals 130 may determine acquisition guard times. Control center 140 may determine an acquisition guard time for the satellite communication system using information from a plurality of positions of terminals from the plurality of terminals and the determined position of the satellite.

The three or more terminals 130 that may be used to provide distance metrics to control center 140 may be selected in different ways. For example, the three or more of a plurality of terminals 130 may be selected to reduce a position error for the determined position of the satellite. Terminals 130 may also be selected to maximize a determinant utilizing a plurality of distances between the three or more of the plurality of terminals and a satellite position. In some embodiments, terminals 130 may be selected such that at least a first terminal, such as terminal 130-b-1 of FIG. 1, and a second terminal, such as 130-a-1 of FIG. 1, from the plurality of terminals are located within different satellite beams.

Figure 3A:
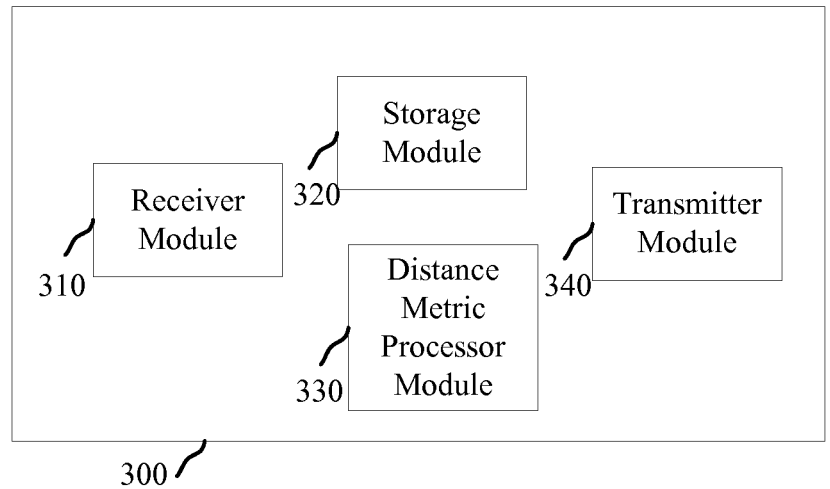
FIG. 3A is a block diagram of a satellite communication control device in accordance with various embodiments.

FIG. 3A is a block diagram of a satellite communication control device 300 for determining distance metrics including but not limited to satellite positions, acquisition control parameters for terminals, and acquisition guard times in accordance with various embodiments. Device 300 may be implemented within systems such as system 100 of FIG. 1 and/or system 200 of FIG. 2 and may implement the methods 400 of FIG. 4 and methods 500 of FIG. 5 as discussed in more detail below. In some embodiments, device 300 may be part of a terminal, such as terminal 130, or satellite 105. In some embodiments, device 300 may be part of control center 140.

Device 300 may include different modules, such as receiver module 310, storage module 320, distance metric processor module 330, and/or transmitter module 340. Device 300 may include other modules. Receiver module 310 may receive different information from the satellite communication network, including information from terminals 130. For example, receiver module 310 may receive distance metric information from different terminals such as the ranging terminals. Information received at receiver module may be stored on storage module 320. Storage module 320 may also store other information, such as the positions of terminals 130, positions of satellite 105, and distance metrics for the different terminals, merely by way of example. Distance metric processor module 330 may provide a variety of functions, including, but not limited to, determining positions of the satellite using distance metric information for different terminals. Device 300 may also include transmitter module 340. Transmitter module 340 may transmit different information into the satellite communication network. For example, transmitter module 340 may transmit determined satellite positions to terminals 130 of system 100 or 200. Transmitter 340 may also transmit other information, such as distance metric information for different terminals, acquisition guard times, and other information, merely by way of example. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 3B:
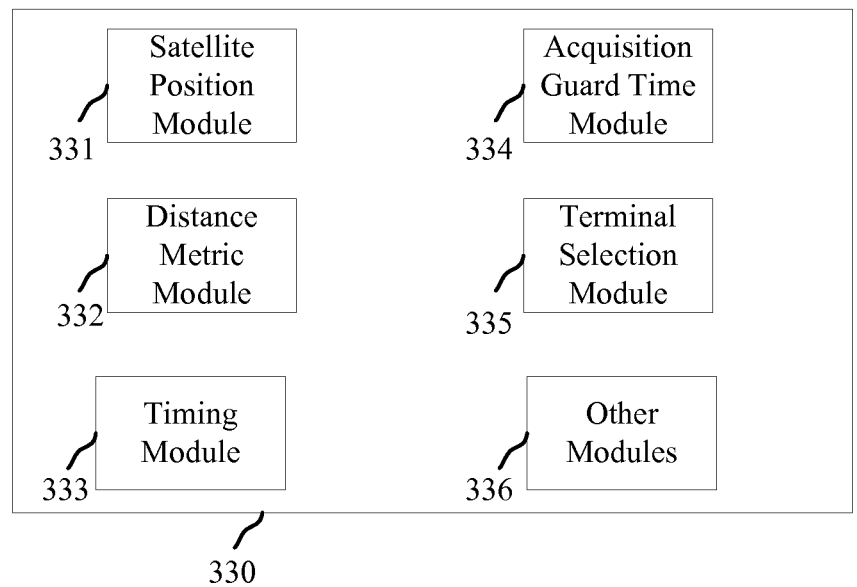
FIG. 3B is a block diagram of a distance metric processor module that may be part of a satellite communication control device in accordance with various embodiments.

FIG. 3B provides a block diagram of a distance metric processor module, such as module 330, of satellite communication control device 300 of FIG. 3A. Distance metric processor module 330 may include different modules, including, but not limited to, satellite position module 331, distance metric module 332, timing module 333, acquisition guard time module 334, terminal selection module 335, and other modules 336. Merely by way of example, satellite position module 331 may determine the position of satellite at different times using distant metric information it may receive from distance metric module 332, storage unit 320, or even directly from receiver module 310. Distance metric module 332 may determine different distance metrics for different terminals, merely by way of example. Timing module 333 may provide different timing functions, including but not limited to determining when the device may update the position of a satellite. Acquisition guard time module 334 may determine acquisition guard times for individual terminals or the satellite communication network as seen with method 400 and/or 500. Terminal selection module 335 may determine which terminals are utilized to provide distance metrics to determine satellite positions, such as seen with block 410 of method 400 and or block 510 of method 500. Device 300 may include other modules 336 that provide other functions also.

Figure 4:
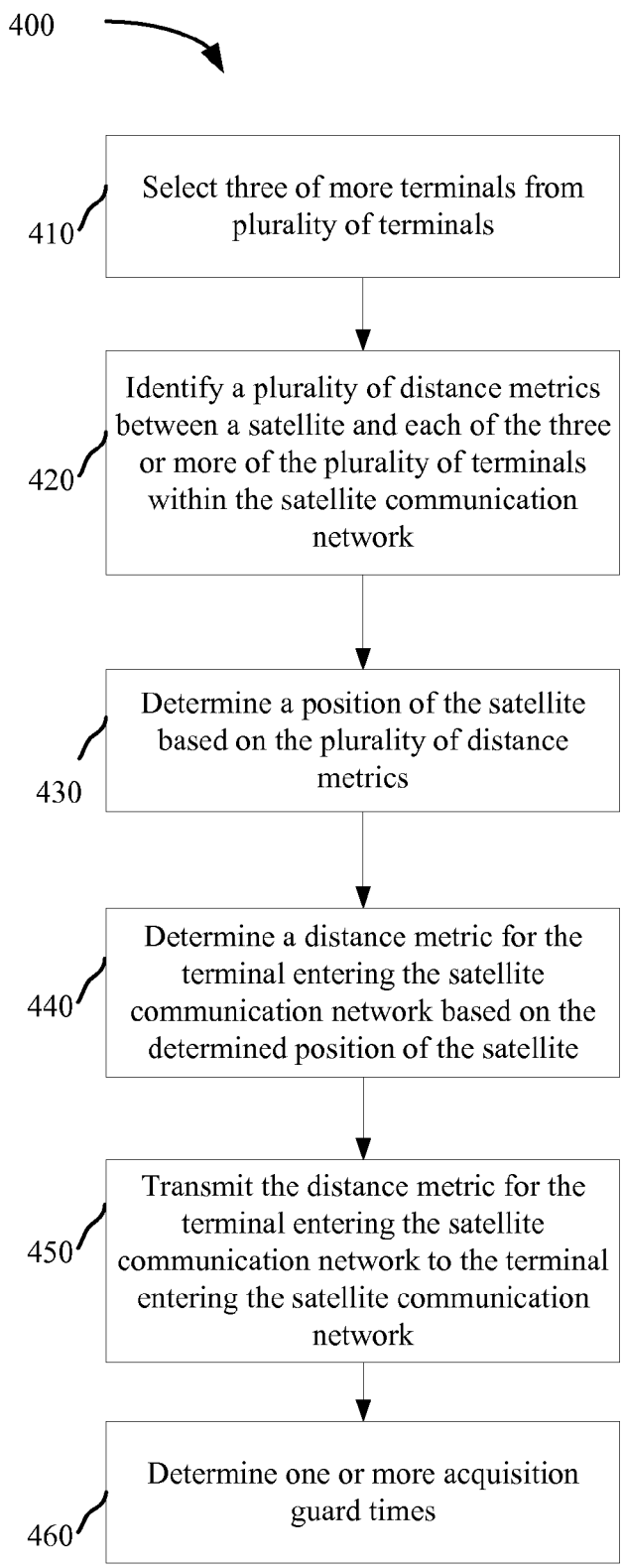
FIG. 4 is a flow diagram of a method of determining acquisition control information for terminals in a satellite communication network in accordance with various embodiments.

FIG. 4 is a block diagram of a method 400 for determining acquisition control information such as satellite positions, acquisition control parameters for terminals, and acquisition guard times. Method 400 may be implemented on systems such as system 100 of FIG. 1 and system 200 of FIG. 2. Method 400 may also be implemented using devices such as device 300 of FIG. 3A and FIG. 3B.

At block 410, three or more terminals may be selected from the terminals served by a satellite. A reference terminal may, but need not, be designated as a ranging terminal. In some embodiments, the terminals are designated in order to form a large geographic triangle within the network of terminals (e.g., within a single beam or a number of beams). The designated ranging terminals may be considered as forming a triangulation base. A triangulation base including the three terminals may be changed at any time to swap-in or otherwise include different terminals. In some embodiments, changing the triangulation base may be done without affecting the operation of the communication network.

In some embodiments, the three or more of a plurality of terminals may be selected to reduce a position error for the determined position of the satellite. Selecting the three or more terminals may involve maximizing a determinant utilizing a plurality of distances between the three or more of the plurality of terminals and a satellite position.

In some embodiments, selection may be made of at least a first terminal and a second terminal from the three or more of the plurality of terminals such that the first terminal and the second terminal are located within different satellite beams.

Thus, in some embodiments, the selected terminals may be supported by different beams of a satellite and seen with system 100 of FIG. 1.

At block 420, distance metrics between a satellite and each of three or more of a plurality of terminals within the satellite communication network may be identified. The distance metrics may be represented in different ways including, but not limited to, an interval of time between a start of transmit frame (SOTF) and a start of receive frame (SORF) for the respective terminal, a transmission propagation delay for the respective terminal, or a distance between the respective terminal and a position of the satellite, merely by way of example. In some embodiments, a control center may identify the distance metrics. The control center may receive the distance metrics from the respective terminals via a satellite.

At block 430, a position of the satellite may be determined based on the plurality of distance metrics. In some embodiments, the position of the satellite may be updated. For example, the frequency of updating the determined position of the satellite may depend on the orbit inclination angle of the satellite.

At block 440, a distance metric may be determined for a terminal entering the satellite communication network. The distance metric may depend upon the determined position of the satellite. Distance metrics may be determined for different terminals within the satellite communication network. In some embodiments, a central control will determine the distance metric for one or more terminals. In some embodiments, a terminal may determine the distance metric for the respective terminal. The distance metrics may be represented in different ways including, but not limited to, an interval of time between a start of transmit frame (SOTF) and a start of receive frame (SORF) for the respective terminal, a transmission propagation delay for the respective terminal, and/or a distance between the respective terminal and the determined position of the satellite. The distance metric may be referred to as an acquisition control parameter or a transmit time control parameter in some embodiments.

At block 450, the distance metric for the terminal entering the satellite communication network may be transmitted to the terminal entering the satellite communication network. In some embodiments, the determined position of the satellite may be transmitted to the terminal and the terminal may determine its distance metric.

At block 460, an acquisition guard time may be determined. An acquisition guard time may be determined for at least one terminal of the plurality of terminals within the satellite communication network using the determined position of the satellite. In some embodiments, an acquisition guard time for the satellite communication network may be determined by using information from a plurality of positions of terminals from the plurality of terminals and the determined position of the satellite.

Figure 5:
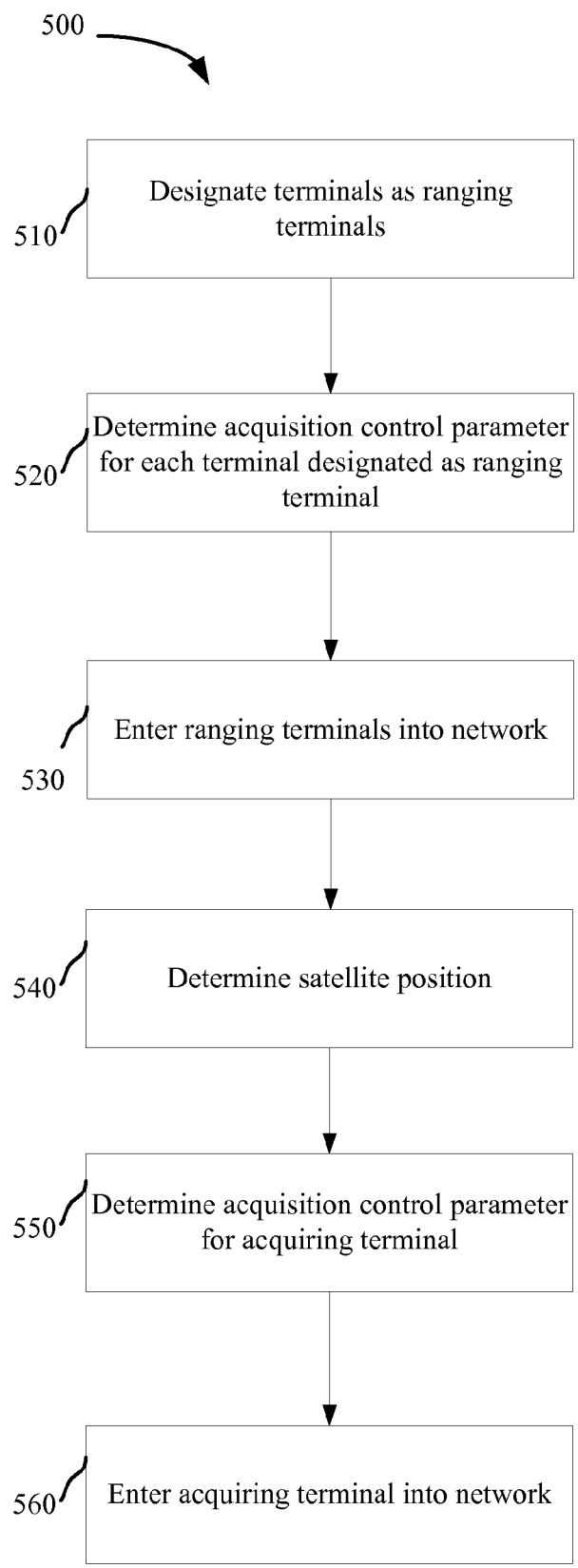
FIG. 5 is a flow diagram of an acquiring terminal entering into the network using a method of triangulation ranging, in accordance with various embodiments.

FIG. 5 is a block diagram of a method 500 for determining acquisition control information such as satellite positions, acquisition control parameters for terminals, and acquisition guard times. Method 500 may be implemented on systems such as system 100 of FIG. 1 and system 200 of FIG. 2. Method 500 may also be implemented using devices such as device 300 of FIG. 3. Aspects of method 500 may also be implemented as part of method 400 of FIG. 4.

At block 510, three or more terminals may be selected from the terminals served by a satellite. A reference terminal may, but need not, be designated as a ranging terminal. In some embodiments, the terminals are designated in order to form a large geographic triangle within the network of terminals (e.g., within a single beam or a number of beams). The designated ranging terminals may be considered as forming a triangulation base. A triangulation base including the three terminals may be changed at any time to swap-in or otherwise include different terminals. In some embodiments, changing the triangulation base may be done without affecting the operation of the communication network. In some embodiments, the selected terminals may be supported by different beams of a satellite.

At block 520, an acquisition control parameter may be determined for each of the terminals, which may have been designated as ranging terminals herein. An acquisition control parameter may be referred to more generally as a distance metric herein. An acquisition control parameter may be used to synchronize terminal transmissions. An acquisition control parameter ($D_a$) for a terminal may be a measured interval of time between a Start of Transmit Frame (SOTF) and a Start of Receive Frame (SORF). An acquisition control parameter may be a measure that reflects the distance between the terminal and the satellite. An acquisition control parameter may reflect a transmission propagation delay. Merely by way of example, an acquisition control parameter for a terminal may be represented by an equation such as the following:

$$D_a = \frac{2 \times (d + \Delta d)}{c}$$

where, $D_a$ is an acquisition control parameter for the terminal, d is a slant range or distance between the terminal and the satellite, $\Delta d$ is a terminal range uncertainty, and c is the speed of light. Terminal range uncertainty may take into account uncertainties related to delays caused by terminal equipment, including cables for example. In some embodiments, the terminal range uncertainty may be calibrated to less than 300 meters.

An acquisition control parameter may be used by an acquiring terminal to coarsely establish transmit frame timing relative to receive frame timing. Since ranging terminals initially may not have precise knowledge of a satellite position, a satellite communication network controller, such as an NCC, may use a nominal or approximate satellite position to determine acquisition control parameters for these terminals. In some embodiments, a nominal or approximate satellite position may be based on a previously determined satellite position.

At block 530, terminals that may have been designated as ranging terminals may enter the satellite communication network (e.g., utilizing the acquisition control parameters). A ranging terminal may enter the network at different times and in different sequences with respect to the other ranging terminals. After a ranging terminal enters the network using an acquisition control parameter that may be provided by the NCC, for example, the terminal may adjust the acquisition control parameter to synchronize its transmit frame timing with a TDMA network frame timing. The adjusted or updated acquisition control parameter may be called a transmit timing control parameter in some embodiments. Transmit timing control parameters may also be more generally referred to as distance metrics herein. Ranging terminals may provide transmit timing control parameters (e.g., to the NCC), periodically reporting them or providing them when polled. Each terminal already in the network may update its transmit timing control parameter based on measured frame timing error. Transmit timing control parameter updating may occur frequently and/or periodically. All active terminals already in the network may provide transmit timing control parameters to the NCC periodically or as requested. The NCC may replace the original ranging terminals by other active terminals to enter inactive terminals into the network with a minimum guard time.

As will be discussed in more detail below, the NCC (or other control terminal) may use transmit timing control parameters to determine acquisition control parameters for other network terminals to bring them into the network. In some embodiments, the NCC may broadcast satellite position information to other terminals in the network, possibly all terminals, and each terminal may determine its own acquisition control parameter from the satellite position information and its terminal location.

As noted above, a terminal designated as a ranging terminal may be a reference terminal. A reference terminal may transmit reference bursts without use of an acquisition control parameter. A reference terminal that transmits its own reference bursts may receive its own reference bursts, from which a transmit timing control parameter for the reference terminal may be determined.

The terminals designated as ranging terminals may be brought up using a nominal guard time. When a reference terminal is one of the ranging terminals, two or more other terminals may be brought up and transmit timing control parameters determined. When a reference terminal is not one of the ranging terminals, three or more terminals may be brought up and transmit timing control parameters determined. In some embodiments, an acquisition control parameter for a terminal may be an averaged acquisition control parameter. An averaged acquisition control parameter may help reduce range error.

When a terminal designated as a ranging terminal is brought up, it may transmit an acquisition burst. A terminal such as a reference terminal may measure the timing error of the ranging terminal from the acquisition burst. Information may be relayed back to the terminal to correct for the timing error. A difference between a start of transmit frame and a start of receive frame may be measured to determine a transmit timing control parameter for the terminal in some embodiments.

At block 540, a satellite position is determined. The satellite position may be determined using information from the transmit timing control parameters. Merely by way of example, when three terminals are chosen as ranging terminals, a distance between each terminal and the satellite may be determined based on measurement of the terminals' transmit timing control parameters. Knowing the positions of the terminals along with each terminal's distance from the satellite may provide information to determine the position of the satellite very accurately.

In some embodiments, satellite coordinates may be determined using the measured distances between the terminals and the satellite, using equations such as the following:

$$(x_s-x_1)^2+(y_s-y_1)^2+(z_s-z_1)^2=d_1^2$$

$$(x_s-x_2)^2+(y_s-y_2)^2+(z_s-z_2)^2=d_2^2$$

$$(x_s-x_3)^2+(y_s-y_3)^2+(z_s-z_3)^2=d_3^2$$

where $(x_i, y_i, z_i)$ are the coordinates for the terminals i=1, 2, 3 selected as ranging terminals and the $d_i$s are the respective measured distances between each designated terminal and the satellite.

There are numerous ways to determine the satellite's coordinates. By way of example, with reference to the discussion and variables related to FIG. 2, the following equations may be used:

$$a_1 = x_1 - x_3, \quad a_2 = y_1 - y_3, \quad a_3 = z_1 - z_3$$

$$a_4 = x_2 - x_3, \quad a_5 = y_2 - y_3, \quad a_6 = z_2 - z_3$$

$$b_1 = (r_1^2 - r_3^2 - d_1^2 + d_3^2)/2, \quad b_2 = (r_2^2 - r_3^2 - d_2^2 + d_3^2)/2$$

$$c_1 = a_1 a_5 - a_2 a_4, \quad c_2 = a_2 a_6 - a_3 a_5, \quad c_3 = a_3 a_4 - a_1 a_6$$

$$e_1 = (a_5 b_1 - a_2 b_2)/c_1, \quad e_2 = (a_1 b_2 - a_4 b_1)/c_1$$

$$a = c_1^2 + c_2^2 + c_3^2, \quad b = e_1 c_2 + e_2 c_3 - x_3 c_2 - y_3 c_3 - z_3 c_1,$$

$$c = z_3^2 - d_3^2 + (e_2 - y_3)^2 + (e_1 - x_3)^2$$

$$g = \frac{-b \pm \sqrt{b^2 - ac}}{a}$$

$$x_s = e_1 + c_2 g, \quad y_s = e_2 + c_3 g, \quad z_s = c_1 g.$$

The two-fold ambiguity in equation "g" may be resolved by selecting the sign that provides the minimum error relative to the nominal satellite position, i.e., select the sign such that $|x_s-x_{s0}|+|y_s-y_{s0}|+|x_s-x_{s0}|$ is minimum, where $(x_{s0}, y_{s0}, z_{s0})$ are the coordinates of the nominal satellite orbit. The preceding set of equations provides an example of how to determine the position of a satellite; knowing the positions of the terminals along with each terminal's distance (e.g., measured in time) from the satellite will allow the satellite position to be determined in a number of ways.

The satellite position determined in block 540 may be considered a current position. A satellite position may be updated periodically. Updating the satellite position may involve determining updated acquisition control parameters for the terminals as seen in block 520. The same terminals chosen in block 510 may be used again, or different terminals may be chosen as ranging terminals.

Figure 7:
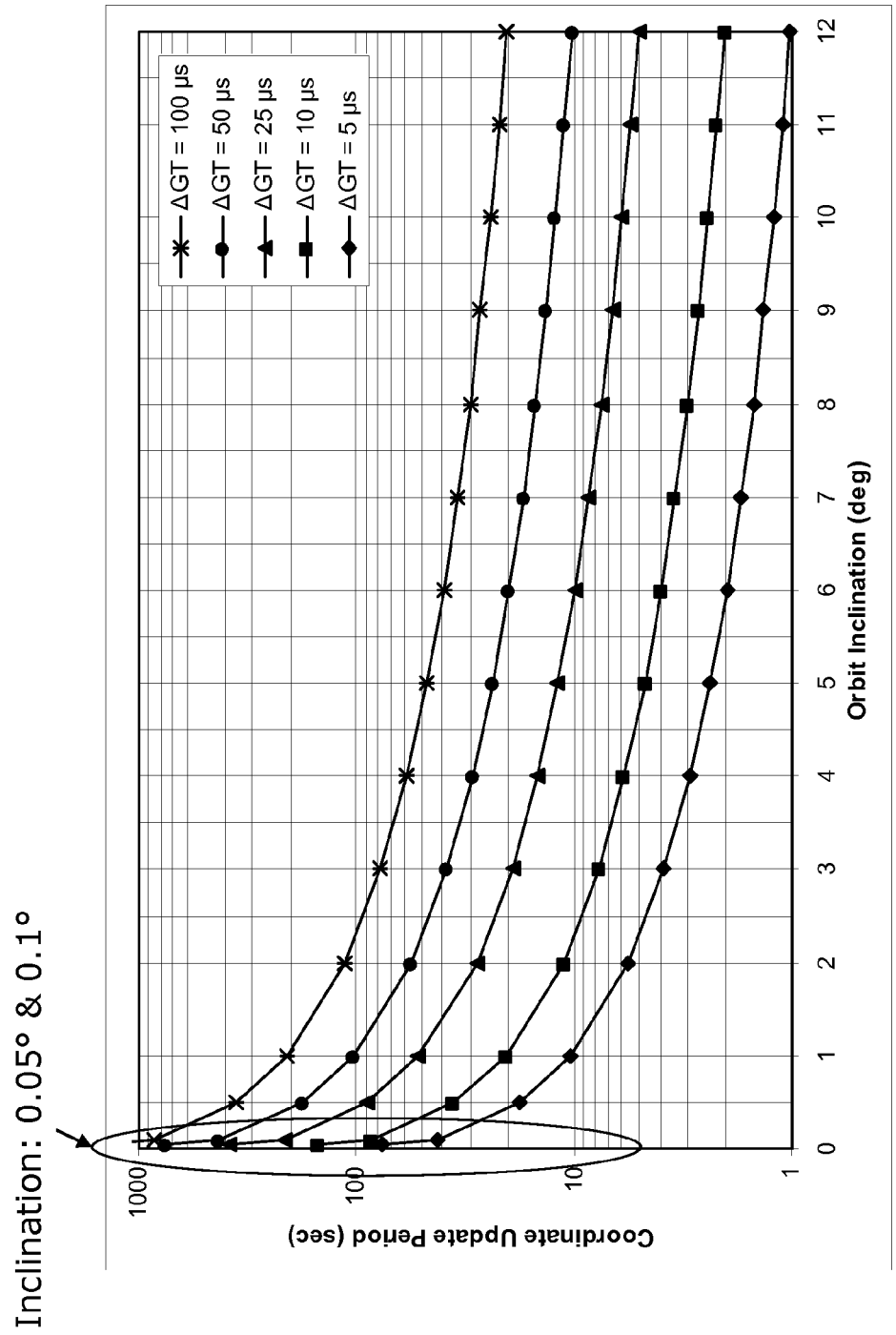
FIG. 7 is a graph of a satellite coordinate update period compared to orbit inclination for different acquisition guard times, in accordance with various embodiments.

The frequency of satellite position updating may be dependent upon the orbit inclination angle. In some embodiments, the larger the orbit inclination angle, the more frequently the satellite position is updated. For example, for an inclination around 12 degrees, updates may occur every few seconds (e.g., every ten seconds). For an inclination of 0.05 degree to 0.1 degree, updates of every several minutes may be appropriate. FIG. 7, discussed in more detail below, provides a graph showing examples of relationships between frequency of updating, orbit inclination, and acquisition guard times.

At block 550, an acquisition control parameter may be determined for other terminals in the network, such as an acquiring terminal that may be entering the network. An acquisition control parameter for other terminals in the network may be based on the satellite position determined at block 540 and each terminal's individual position. The determined acquisition control parameter for a terminal may be used for different purposes. Merely by way of example, the acquisition control parameter may be used to synchronize the communication from the terminal, such as when the terminal wishes to enter the network. The acquisition control parameters for the terminals may also be used for numerous purposes, including but not limited to determining range estimation error for the network of terminals, helping reduce acquisition guard time, and helping an acquiring terminal enter a network as discussed in the block 560.

In some instances, for example, if acquisition guard times are relatively small compared with a TDMA frame period, acquisition parameters may also be used as transmit timing control parameters for open loop synchronization. In this case, the NCC may broadcast satellite position information determined by the ranging terminal's transmit timing control parameters to all other terminals. Each terminal may then determine its transmit timing control parameter from the satellite position information and its terminal location and transmit bursts without going through a transmit acquisition process. A terminal may adjust its transmit timing based on the most recent satellite position information and its terminal location without a feedback from the NCC on the transmit timing error. Transmit timing adjustments may occur periodically and/or frequently in some embodiments.

At block 560, the acquiring terminal may enter a satellite communication network. Entering the network may depend on the acquisition guard time determined at block 550. An acquiring terminal may enter the network at different times and/or in different sequences with respect to other acquiring terminals. Multiple acquiring terminals may enter utilizing acquisition guard times. An acquiring terminal may enter before or after an acquisition guard time is determined for the network of terminals. An acquisition guard time may be based on the locations of the specific terminals. An acquisition guard time may be based on a worst location in the network coverage area.

The following description merely provides examples of acquisition guard time determination. Other means of determining acquisition guard times based on triangulation ranging may also be used.

An uncertainty factor for the satellite's coordinates due to range estimation error may be determined in numerous ways. In one embodiment, the coordinates of the ranging terminals (e.g., from block 510) and the position of the satellite (e.g., from block 540) may be used with the following equations:

$$(x_s - x_1)\Delta x_s + (y_s - y_1)\Delta y_s + (z_s - z_1)\Delta z_s = d_1 \Delta d_1$$
$$(x_s - x_2)\Delta x_s + (y_s - y_2)\Delta y_s + (z_s - z_2)\Delta z_s = d_2 \Delta d_2$$
$$(x_s - x_3)\Delta x_s + (y_s - y_3)\Delta y_s + (z_s - z_3)\Delta z_s = d_3 \Delta d_3$$

$$\begin{bmatrix} \Delta x_s \\ \Delta y_s \\ \Delta z_s \end{bmatrix} = \begin{bmatrix} x_s - x_1 & y_s - y_1 & z_s - z_1 \\ x_s - x_2 & y_s - y_2 & z_s - z_2 \\ x_s - x_3 & y_s - y_3 & z_s - z_3 \end{bmatrix}^{-1} \begin{bmatrix} d_1 \Delta d_1 \\ d_2 \Delta d_2 \\ d_3 \Delta d_3 \end{bmatrix}$$

where $(x_s, y_s, z_s)$ are the satellite coordinates determined in block 530, $(x_i, y_i, z_i)$ are the coordinates of terminals i=1, 2, and 3, $(d_1, d_2, d_3)$ are the distances between terminals i=1, 2, 3 and the satellite, and $(\Delta d_1, \Delta d_2, \Delta d_3)$ are the range uncertainties for measured distance between satellite and each terminal i=1, 2, 3.

Using equations such as those shown above, values for $(\Delta x_s, \Delta y_s, \Delta z_s)$ for eight satellite corner points (i.e., $\Delta d_i = \pm \Delta d$, i=1, 2, 3) may be determined. The satellite coordinate errors may be used to estimate range error and acquisition guard time for the network.

Estimation of range error for each user terminal ($\Delta d_{ut}$) with coordinates $(x_e, y_e, z_e)$ and range $d_e$ based on the nominal satellite position and eight satellite corner coordinates may be determined in different ways, including but not limited to the following equation:

$$|\Delta d_{ut}| = \frac{|(x_s - x_e)\Delta x_s + (y_s - y_e)\Delta y_s + (z_s - z_e)\Delta z_s|}{d_e} + \Delta d$$

where the first term is due to satellite position determination error and the second term $\Delta d$ is a terminal's intrinsic range uncertainty.

Using the information determined at the previous blocks may allow an acquisition guard time to be reduced, compared to an acquisition guard time based on a satellite's nominal position. While there are numerous ways to determine an acquisition guard time based on this information, in some embodiments, an acquisition guard time may be computed for an individual user terminal as:

$$GT = \frac{4|\Delta d_{ut}|}{c}.$$

An acquisition guard time for a network may also be determined using an equation such as the following:

$$GT = \frac{4|\Delta d_{ut}|_{max}}{c}.$$

An acquisition guard time for a network may be a maximum guard time among all network terminals. An acquisition guard time for a network may be a guard time for the worst location in the coverage area. A worst location in a coverage area may be pre-computed offline.

In some embodiments, at block 510, the designation of terminals as ranging terminals may be based on selecting a base of at least three terminals that may reduce and/or minimize satellite coordinate estimation error. Choosing a wider geographic triangle (T-Base) formed by the three chosen terminals may reduce the error in determining satellite coordinates. Generally, for selected ranging terminals, network terminals within the triangle have satellite coordinate estimation errors that may be very close to a minimum. A reference terminal may be part of a T-Base. A T-Base can be selected by maximizing the absolute value of the following determinant among all network terminals:

$$D = \begin{vmatrix} x_s - x_1 & y_s - y_1 & z_s - z_1 \\ x_s - x_2 & y_s - y_2 & z_s - z_2 \\ x_s - x_3 & y_s - y_3 & z_s - z_3 \end{vmatrix}.$$

Figure 6:
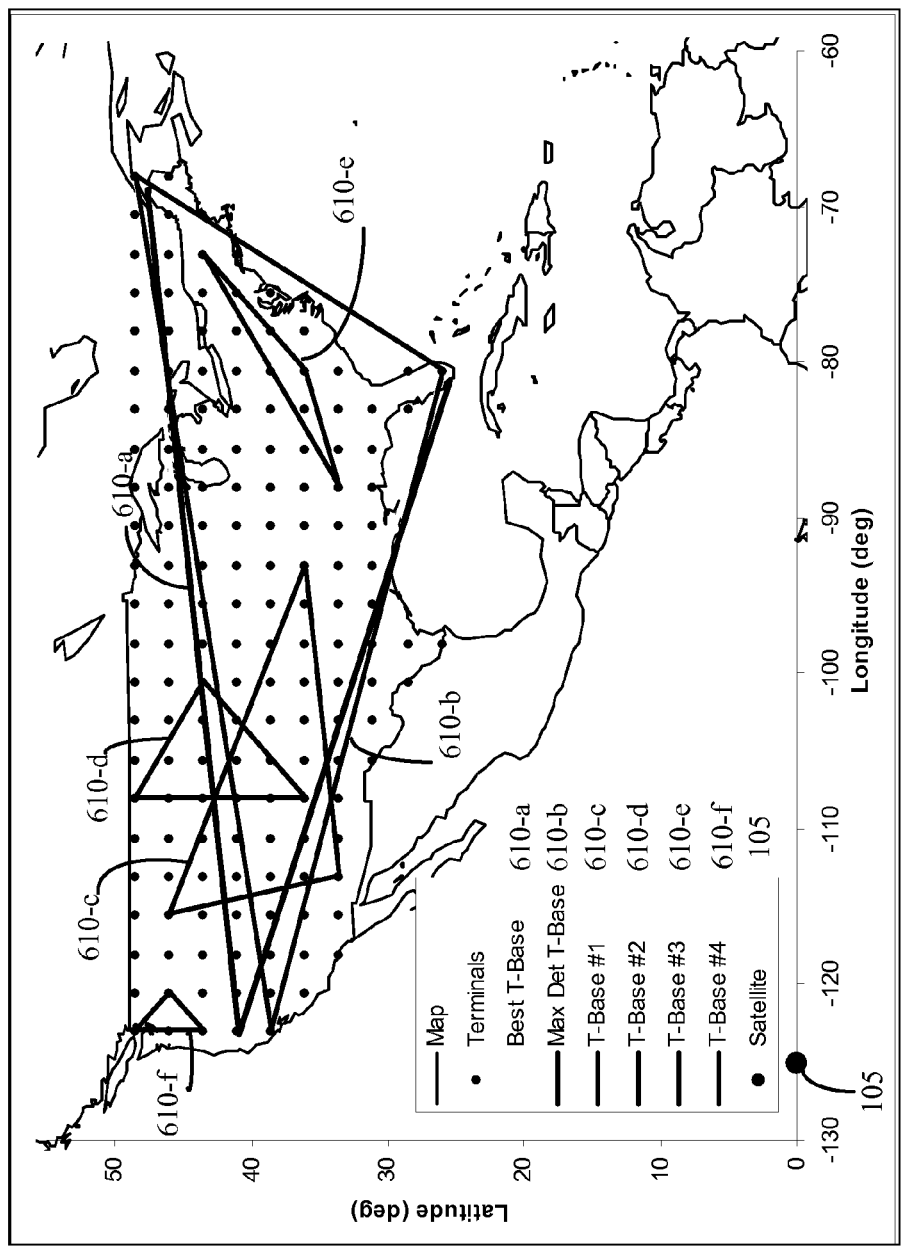
FIG. 6 is a diagram of a satellite communication system involving triangulation ranging with different triangulation bases, in accordance with various embodiments.

FIG. 6 provides a geographic depiction of different T-bases in accordance with various embodiments. Satellite 105 is shown along with a set of ranging terminals represented as dots on the geographic map. Each T-base includes three terminals with one terminal at each vertex of a triangle forming a T-Base. A Best T-Base 610-a, with the lowest acquisition guard time, is shown. In the figure, the Best T-Base is determined by the minimum network guard time among all possible T-Bases consisting of all network terminals. In addition, several T-Bases are shown with different normalized determinant values in the following table. T-Base 610-b has the largest normalized determinant value and an acquisition guard time closest to the best T-Base 610-a value. Four additional example T-Bases with lower normalized determinant values are also shown at 610-c, 610-d, 610-e, and 610-f. Values for calculated acquisition guard times ("GT") and normalized determinant values for each T-Base are provided below:

| Triangulation Base | Acquisition GT (µs) | Normalized |D| |
|---|---|---|
| Best T-Base 610-a | 10 | 0.986 |
| Max Det T-Base 610-b | 11 | 1 |
| T-Base #1 610-c | 18 | 0.261 |
| T-Base #2 610-d | 35 | 0.085 |
| T-Base #3 610-e | 109 | 0.035 |
| T-Base #4 610-f | 155 | 0.011 | where the uncertainty in the acquisition control parameter $D_a$ is ±2 µs. The above table may illustrate that a T-Base with the maximum determinant value may be very close to the Best T-Base.

In some embodiments, alternative T-base candidates may be identified that may cope with ranging terminal outage. Ranging terminal selection may also be done dynamically based on the maximum determinant T-base among the active terminals.

The frequency that the satellite coordinates are updated may also have an effect on acquisition guard time. FIG. 7 provides a graph showing relationships between a satellite coordinate update period and orbit inclination for different acquisition guard times in accordance with various embodiments. The update periods reflected in FIG. 7 may reflect typical values, which may be larger or smaller depending on the triangulation base and the acquisition control parameter accuracy.

III. Single Terminal Ranging: Methods, systems, and devices for single terminal ranging are also available, and described in further detail below. Single station ranging may be used to determine distance metrics such as satellite positions, acquisition control parameters, and acquisition guard times. One terminal may be chosen from a number of terminals to serve as a ranging terminal. An acquisition control parameter difference, which may be referred to as a difference between distance metrics, may be determined for the ranging terminal based on a difference between a measured transmit timing control parameter and a nominal acquisition control parameter. A nominal parameter may be a previously determined parameter in some embodiments; in some embodiments, a nominal parameter may be an averaged parameter or standard parameter. The acquisition control parameter difference may then be used for other terminals, such as an acquiring terminal, to estimate their acquisition control parameters. Acquisition guard times may also be determined using single terminal ranging.

Single terminal ranging may provide good acquisition control parameters and acquisition guard times for a network deployed in a small geographic area, which may include spot beams. For such a network, each terminal may generally experience similar satellite motion.

Figure 8:
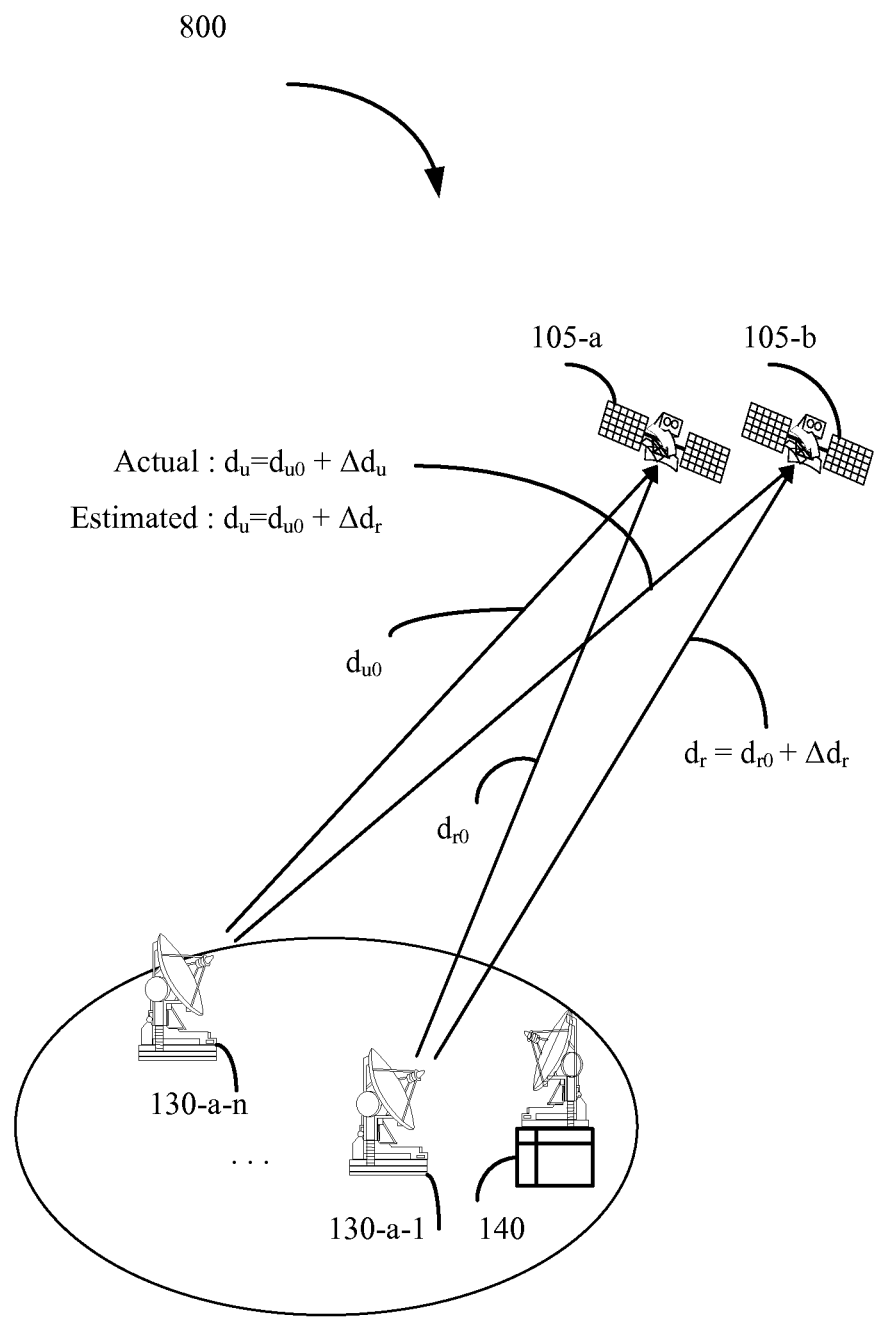
FIG. 8 is a block diagram of a satellite communication system involving single terminal ranging, in accordance with various embodiments.

FIG. 8 illustrates a system 800 for single terminal ranging, which may be an example of the system 100 of FIG. 1. System 800 shows a number of terminals 130-a-1 to 130-a-n, from which a given terminal may be designated as a single ranging terminal. In some embodiments, the single ranging terminal may be a reference terminal. Satellite 105 may be in different positions. Satellite 105-a may be considered the satellite's nominal position, while satellite 105-b may be considered an actual position of the satellite, due to movement of satellite 105. With single terminal ranging, a nominal distance $d_{r0}$ between terminal 130-a-1 and satellite 105-a may be determined. In addition, an actual distance $d_r = d_{r0} + \Delta d_r$ between terminal 130-a-1 and satellite 105-b may be determined. A nominal distance $d_{u0}$ between another terminal, such as a terminal 130-a-n, and satellite 105-a may be determined. A nominal distance may be a previously determined distance in some embodiments. A nominal distance may also be an average or standard distance between a terminal and a satellite. The actual distance between terminal 130-a-n and satellite 105-b may be $d_u = d_{u0} + \Delta d_u$. With single station ranging, the distance between terminal 130-a-n and satellite 105-b may be estimated using the $\Delta d_r$ value determined from the terminal 130-a-1 designated as a ranging terminal. Thus, an estimated distance between terminal 130-a-n and satellite 105-b may be estimated using an equation such as $d_u = d_{u0} + \Delta d_r$.

While system 800 shows nominal and actual distances between the terminals 130 and the satellite 105 along with illustrating a single station ranging estimation for a distance between an acquiring terminal and an actual satellite position, acquisition control parameters, which may be referred to as distance metrics in some embodiments, may also be used to reflect comparable information. For example, an acquisition control parameter difference $\Delta D_a$ may be determined between a measured $D_a$ (transmit timing control parameter) and a nominal $D_a$ (acquisition control parameter) for the ranging terminal. The acquisition control parameter for a terminal may then be determined by adding $\Delta D_a$ to the nominal $D_a$ for the terminal. Thus, an acquiring terminal such as terminal 130-a-n may have its acquisition control parameter $D_a$ adjusted by the same amount as observed at the terminal chosen as a ranging terminal, 130-a-1. The following method provides several examples of ways of implementing single station ranging on a system such as systems 100 of FIG. 1 and 800 of FIG. 8.

A satellite communication control center 140, such as an NCC, may compute and distribute acquisition control parameters to individual terminals based on the measured acquisition control parameter difference $\Delta D_a$, a nominal satellite position, and terminal locations. Some embodiments may involve a controller, such as an NCC, broadcasting the acquisition control parameter difference (or a range difference $\Delta d_r$) to the network terminals, and each terminal may determine its acquisition control parameter from $\Delta D_a$, a nominal satellite position, and its terminal location.

As will be discussed in more detail below, different techniques for single terminal ranging may be utilized to make the measurements using existing terminals within a satellite communication system such as systems 100 of FIG. 1 and 800 of FIG. 8. Along with determining satellite position accurately, which may be updated periodically, distance metrics including acquisition control information such as acquisition control parameters and acquisition guard times may be determined for individual terminals and the satellite communication system or network.

For example, satellite communication system 800 may be configured to determine acquisition control information for terminals 130 within satellite communication system 800. System 800 may include multiple terminals 130-a-1, . . . , 130-a-n and at least one control center 140 in communication with at least a subset of the terminals. Control center 140 may be configured to receive a real-time distance metric between satellite 105 and a terminal, such as terminal 130-a-1, merely by way of example. Control center 140 may determine a difference between the real-time distance metric and a previously determined distance metric between satellite 104 and terminal 130-a-1. Control center 140 may be configured to transmit information based on the determined difference to at least a second terminal, such as terminal 130-a-n, merely by way of example, from the multiple terminals 130 within the satellite communication system.

In some embodiments, satellite communication system 800 may include control center 140 that may be further configured to transmit information based on the determined difference to multiple terminals 140 in satellite communication system 800. Terminals 130, such as terminal 130-a-n, merely by way of example, may be configured to receive the information based on determined difference. Terminals 130 may determine a distance metric between satellite 105 and the respective terminal 130 using the information based on the determined difference and a previously determined distance metric between satellite 105 and respective terminal 130.

Control center 140 may be further configured to transmit a distance metric based on a previously determined distance metric between satellite 105 and respective terminals 130 combined with the determined difference. Such distance metrics may be represented in different ways including, but not limited to, an interval of time between a start of transmit frame (SOTF) and a start of receive frame (SORF) for the respective terminal, a transmission propagation delay for the respective terminal, or a distance between the respective terminal and the determined position of the satellite.

Control center 140 may determine satellite positions on a frequent basis. For example, control center 140 may be configured to update the determined position of the satellite, wherein a frequency of updating depends on the orbit inclination angle of the satellite. In some embodiments, control center 140 may also receive real-time distance metrics from different terminals 130 based on the availability of a terminal to provide distance metric information to control center 140.

Control center 140 may also determine an acquisition guard time of at least one terminal from the plurality of terminals 130 within the satellite communication system using the determined difference. In some embodiments, individual terminals 130 may determine acquisition guard times. Control center 140 may determine an acquisition guard time for the satellite communication system using information the determined difference.

Terminal 130 that may be used to provide real-time distance metrics to control center 140 may be selected in different ways. For example, terminal 130 may be chosen to be a ranging terminal in order to minimize an acquisition guard time. Terminal 130 may be chosen such that it is situated approximately around the center of a network coverage area. The choice of terminal 130 as a ranging terminal may be dependent upon an orbit inclination. For a multi-beam system, a terminal within each beam may be chosen as a ranging terminal for the beam. The selected terminal may be a reference terminal such as a master, or secondary, reference terminal. Designation of a terminal as a ranging terminal may be changed at any time. Changing which terminal is used as a ranging terminal may reflect the availability of active terminals, or reflect a changing optimum terminal location.

Figure 9A:
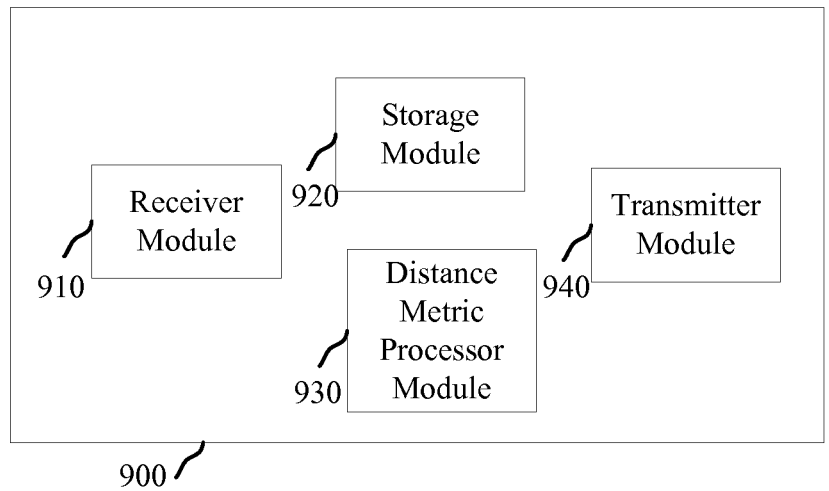
FIG. 9A is a block diagram of a satellite communication control device in accordance with various embodiments.

FIG. 9A is a block diagram of a satellite communication control device 900 for determining distance metrics including satellite positions, acquisition control parameters for terminals, and acquisition guard times in accordance with various embodiments. Device 900 may be implemented within systems such as system 100 of FIG. 1 and system 800 of FIG. 8 and may implement methods 1000 of FIG. 10 and 1100 of FIG. 11 as discussed below. In some embodiments, device 900 may be part of a terminal, such as terminal 130, or satellite 105. In some embodiments, device 900 may be part of control center 140.

Device 900 may include different modules, such as receiver module 910, storage module 920, distance metric processor module 930, and/or transmitter module 940. Device 900 may include other modules. Receiver module 910 may receive different information for the satellite communication network, including information from terminals 130. For example, receiver module 910 may receive real-time distance metric and/or previously determined distance metric information from different terminals such as a ranging terminal in the satellite communication network. Information received at receiver module 910 may be stored on storage module 920. Storage module 920 may also store other information, such as the positions of terminals 130, positions of satellite 105, and distance metrics for the different terminals, merely by way of example. Distance metric processor module 930 may provide a variety of functions, including, but not limited to, determining positions of the satellite using distance metric information for different terminals and/or determining differences between real-time distance metric(s) and previously determined distance metric(s) between a satellite and terminal(s). Device 900 may also include transmitter module 940. Transmitter module 940 may transmit different information into the satellite communication network. For example, transmitter module 940 may transmit the determined difference between real-time distance metric(s) and previously determined distance metric(s) between a satellite and terminal(s). Transmitter 940 may also transmit other information, such as distance metric information for different terminals, acquisition guard times, and other information, merely by way of example. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 9B:
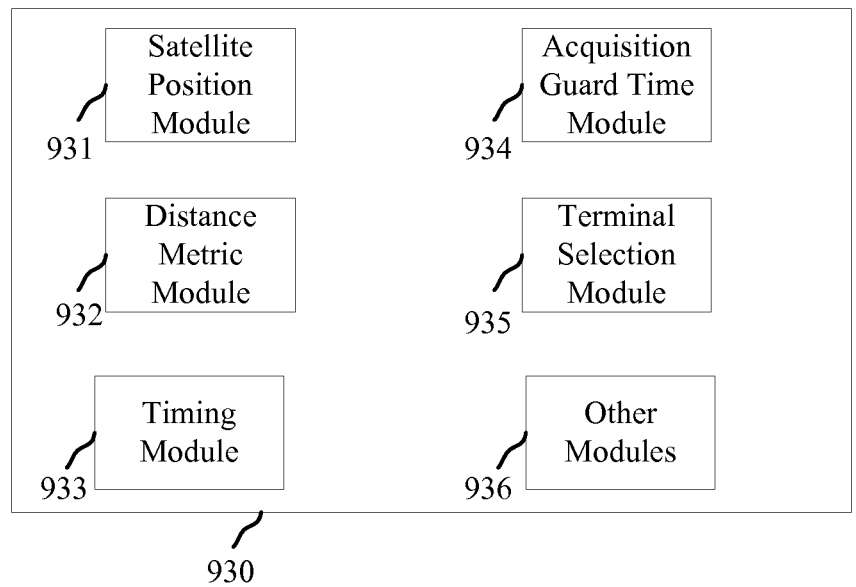
FIG. 9B is a block diagram of a distance metric processor module that may be part of a satellite communication control device in accordance with various embodiments.

FIG. 9B provides a block diagram of a distance metric processor module, such as module 930, of satellite communication control device 900 of FIG. 9A. Distance metric processor module 930 may include different modules, including, but not limited to, satellite position module 931, distance metric module 932, timing module 933, acquisition guard time module 934, terminal selection module 935, and other modules 936. Merely by way of example, satellite position module 931 may determine the position of satellite at different times using distant metric information it may receive from distance metric module 932, storage unit 920, or even directly from receiver module 910. Distance metric module 932 may determine different distance metrics for different terminals, merely by way of example. For example, distance metric module 932 may determine difference(s) between real-time distance metric(s) and previously determined distance metric(s) between a satellite and terminal(s). Timing module 933 may provide different timing functions, including but not limited to determine when device may update the position of a satellite or update a determine difference between real-time distance metric(s) and previously determined distance metric(s) between a satellite and terminal(s). Acquisition guard time module 934 may determine acquisition guard times for individual terminals or the satellite communication network as seen with method 1000 and/or 1100 discussed below. Terminal selection module 935 may determine which terminals are utilized to provide distance real-time distance metrics to determine satellite positions and/or difference between real-time distance metrics and previously determined distance metrics, such as seen with block 1000 of method 1000 and/or block 1100 of method 1100. Device 900 may include other modules 936 that provide other functions also.

Figure 10:
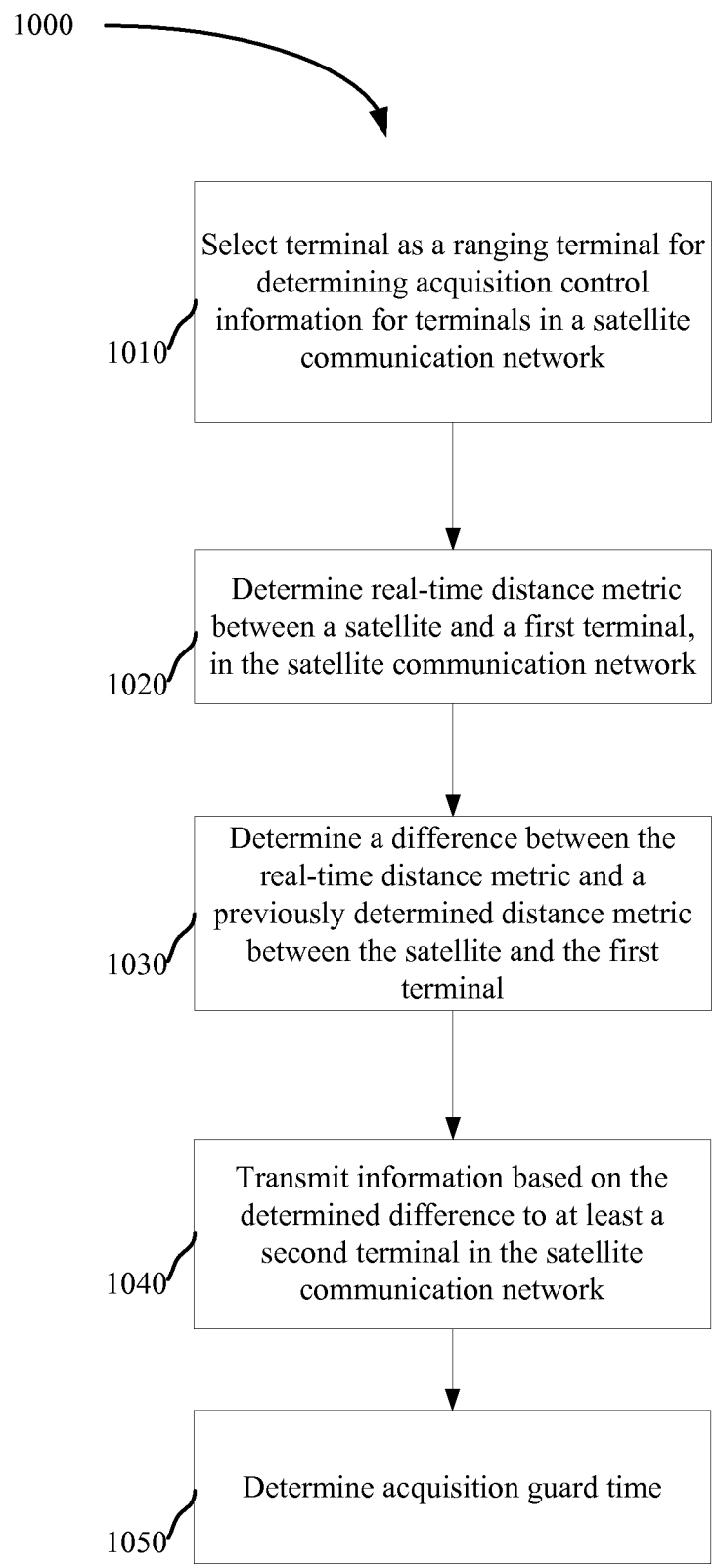
FIG. 10 is a flow diagram of a method of single terminal ranging, in accordance with various embodiments.

FIG. 10 provides a method 1000 of single terminal ranging, which may be implemented on system 100 of FIG. 1 and/or system 800 of FIG. 8. Method 1000 may also be implemented utilizing devices such as 900 of FIG. 9.

At block 1010, a terminal may be selected as a ranging terminal for determining acquisition control information for terminals in a satellite communication network. A terminal may be chosen to be a ranging terminal in order to minimize an acquisition guard time. A terminal may be chosen such that it is situated approximately around the center of a network coverage area. The choice of a terminal as a ranging terminal may be dependent upon an orbit inclination. For a multi-beam system, a terminal within each beam may be chosen as a ranging terminal for the beam. The selected terminal may be a reference terminal such as a master, or secondary, reference terminal. Designation of a terminal as a ranging terminal may be changed at any time. Changing which terminal is used as a ranging terminal may reflect the availability of active terminals, or reflect a changing optimum terminal location.

At block 1020, a real-time distance metric between a satellite and a first terminal, such as the terminal selected at block 1010, in the satellite communication network, may be determined.

At block 1030, a difference between the real-time distance metric and a previously determined distance metric between the satellite and the first terminal may be determined. In some embodiments, a difference between the real-time distance metric and a previously determined distance metric between the satellite and the first terminal may be updated based on the orbit inclination of the satellite.

At block 1040, information based on the determined difference may be transmitted to at least a second terminal in the satellite communication network. The determined difference may be transmitted multiple and/or all terminals in the satellite communication network in some embodiments. In some embodiments, the information transmitted to the terminals may be the determined difference to the respective terminals in the satellite communication network. In some embodiments, a previously determined distance metric between the satellite and a respective terminal combined with the determined difference may be transmitted to the respective terminal.

In some embodiments, terminals may receive the determined difference. A distance metric between the satellite and a respective terminal may be determined at the respective terminal using the determined difference and a previously determined distance metric between the satellite and the respective terminal. The distance metrics may be represented in different ways including, but not limited to, an interval of time between a start of transmit frame (SOTF) and a start of receive frame (SORF) for the respective terminal, a transmission propagation delay for the respective terminal, or a distance between the respective terminal and a position of the satellite, merely by way of example.

At block 1050, an acquisition guard time for a respective terminal may be determined based on the determined difference from block 1030. In some embodiments, an acquisition guard time for the satellite communication network may be determined based on the determined difference.

Figure 11:
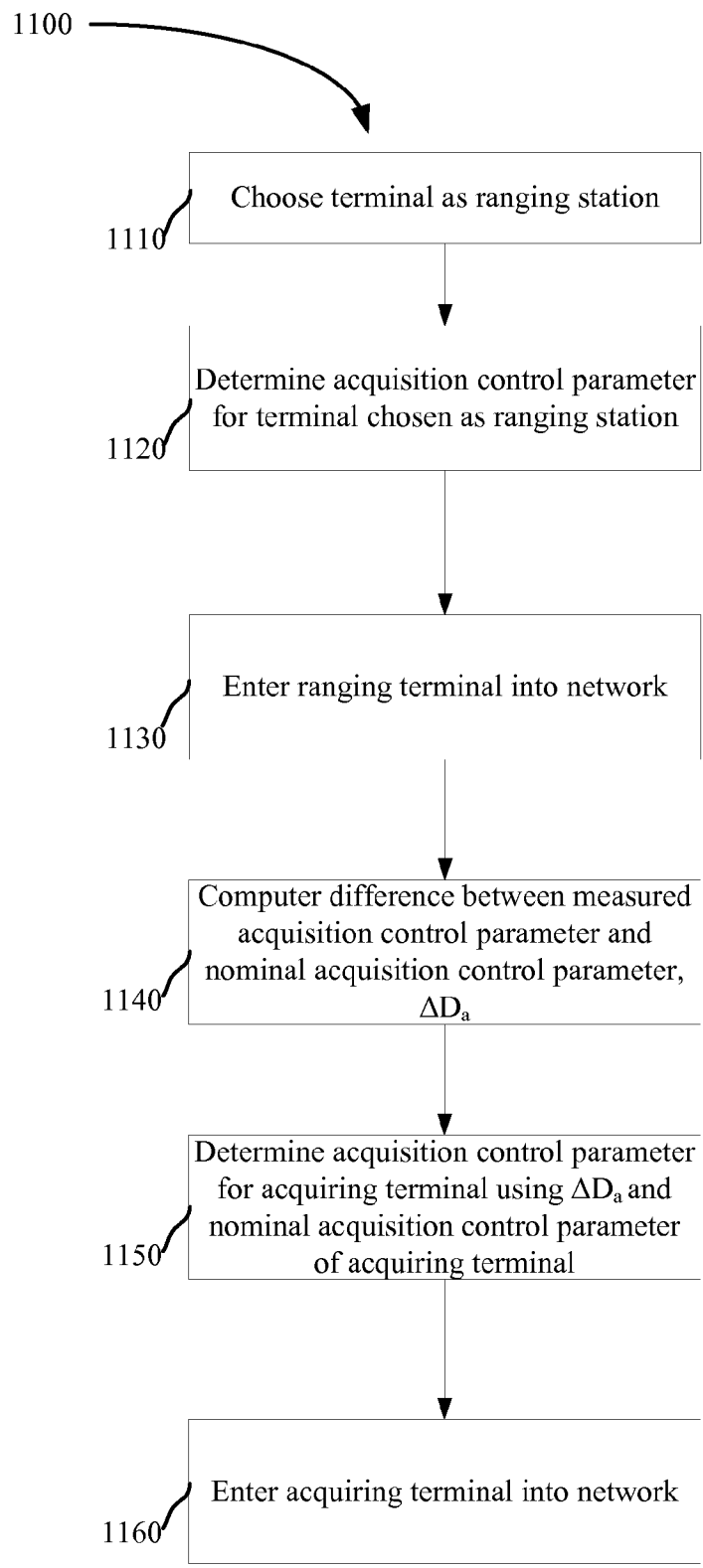
FIG. 11 is a flow diagram of a method of single terminal ranging, in accordance with various embodiments.

FIG. 11 provides a method 1100 of single terminal ranging, which may be implemented on system 100 of FIG. 1 and/or system 800 of FIG. 8. Method 1100 may be implemented using devices such as device 900 of FIG. 9. Method 1100 may further clarify the implementation of different aspects of method 1000 of FIG. 10.

At block 1110, a terminal may be chosen or designated as a ranging terminal. A terminal may be chosen to be a ranging terminal in order to minimize an acquisition guard time. A terminal may be chosen such that it is situated approximately around the center of a network coverage area. The choice of a terminal as a ranging terminal may be dependent upon an orbit inclination. For a multi-beam system, a terminal within each beam may be chosen as a ranging terminal for the beam. The selected terminal may be a reference terminal such as a master, or secondary, reference terminal. Designation of a terminal as a ranging terminal may be changed at any time. Changing which terminal is used as a ranging terminal may reflect the availability of active terminals, or reflect a changing optimum terminal location.

At block 1120, distance metrics such as acquisition control parameters may be determined for the ranging terminal. In some embodiments, an acquisition control parameter may be a difference between a start of transmit frame and a start of receive frame, or reflect a distance between a terminal and a satellite. An acquisition control parameter may reflect a transmission propagation delay. Several alternative acquisition control parameters for the terminal may be used in different embodiments. An acquisition control parameter may be determined based on a nominal position of the satellite, which may be represented as $D_{a\_nominal}$. After a ranging terminal enters the network, an acquisition control parameter may be adjusted based on transmit frame synchronization with the network frame timing, which may be represented as $D_{a\_current}$. The adjusted acquisition control parameter may also be called a transmit timing control parameter.

At block 1130, a terminal designated as a ranging terminal may enter the satellite communication network. A ranging terminal may enter the network at different times and in different sequences with respect to the other terminals. At block 1140, a difference between these two control parameters $D_{a\_nominal}$ and $D_{a\_current}$ may be determined, which may be represented as $\Delta D_a$. In some embodiments, a controller, such as a Network Control Center, may determine these acquisition control parameters and compute their difference.

At block 1150, an acquisition control parameter may be determined by adding $\Delta D_a$ to a nominal $D_a$ for another terminal in the network, such as an acquiring terminal. An acquisition control parameter for a terminal may be used for different purposes, including but not limited to synchronizing the terminal within the network and/or helping determine an acquisition guard time. A terminal may enter a network based on the acquisition control parameter.

At block 1160, an acquiring terminal may enter a satellite communication network. Entering the network may depend on the acquisition control parameter determined for an acquiring terminal at block 1150. An acquiring terminal may enter the network at different times and in different sequences with respect to the other terminals. Multiple acquiring terminals may enter the network using acquisition control parameters that may be determined as in block 1150. An acquiring terminal may enter the network before or after an acquisition guard time is determined using single terminal ranging. An uncertainty for the satellite's position, which may be represented as $(\Delta x_s, \Delta y_s, \Delta z_s)$, may be determined. Merely by way of example, the uncertainty may be based on an orbit inclination $\theta$, an east-west drift $\phi$, and eccentricity e. In some embodiments, an east-west drift $\phi$ may be approximately 0.1°, and an eccentricity e may be approximately between 0.0003-0.0005. An uncertainty for the satellite position may be determined using an equation such as the following:

$$\Delta x_s = er_s, \Delta y_s = \phi r_s, \Delta z_s = \theta r_s$$

along with an array of terminals represented as dots on the geographic map. A best ranging terminal 130-e-1 is shown, along with a sample ranging terminal 130-e-2. Acquisition guard times determined for each of these networks are provided below for inclinations 0.1° and 12° and $\Delta Da = \pm 2$ μs.

Figure 13:
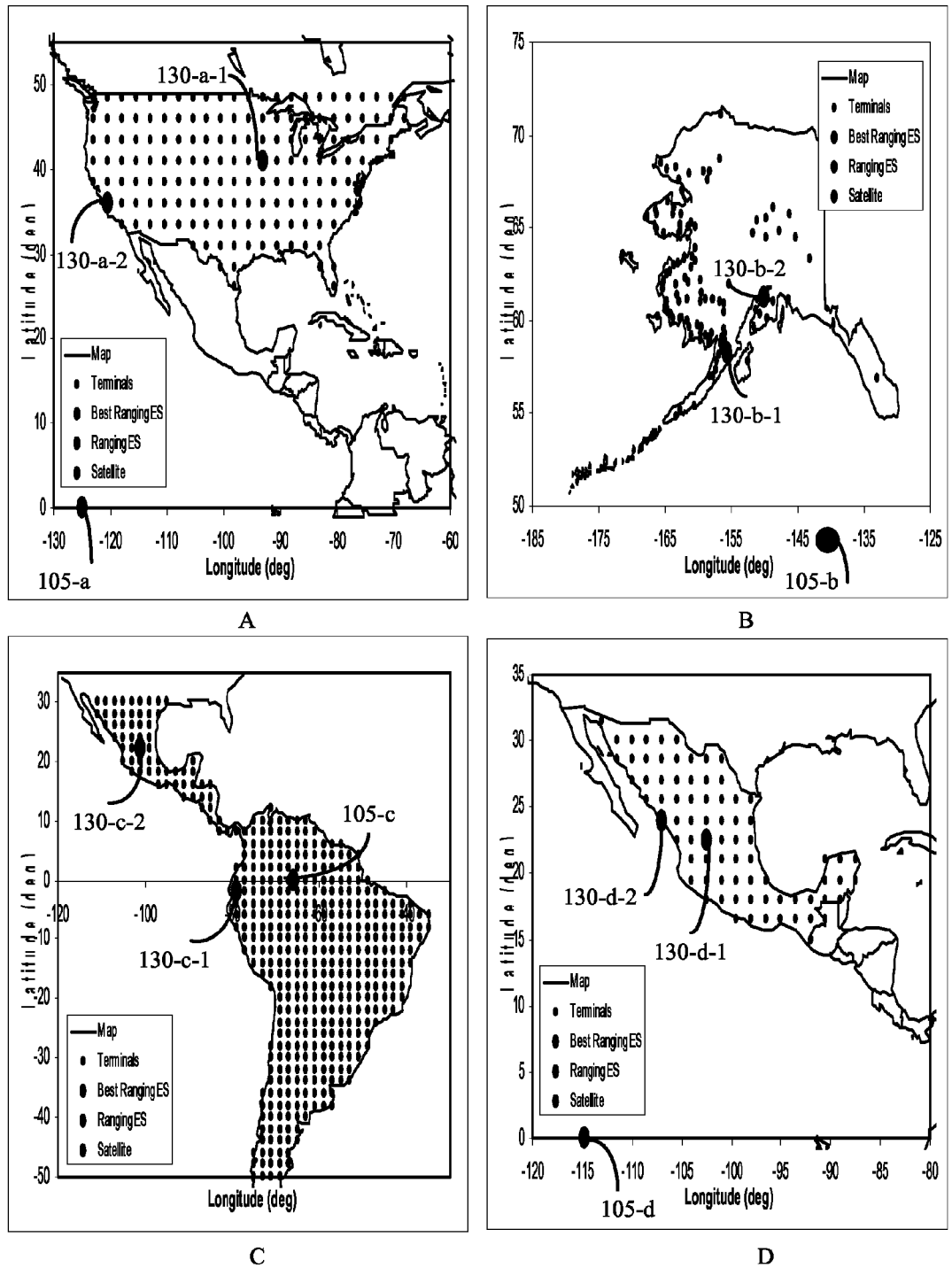
FIGS. 13A-D are diagrams of a satellite communication system involving single terminal ranging for a network covering the following geographical regions: (A) the United States; (B) Alaska; (C) Latin America; and (D) Mexico, in accordance with various embodiments.
Figure 14:
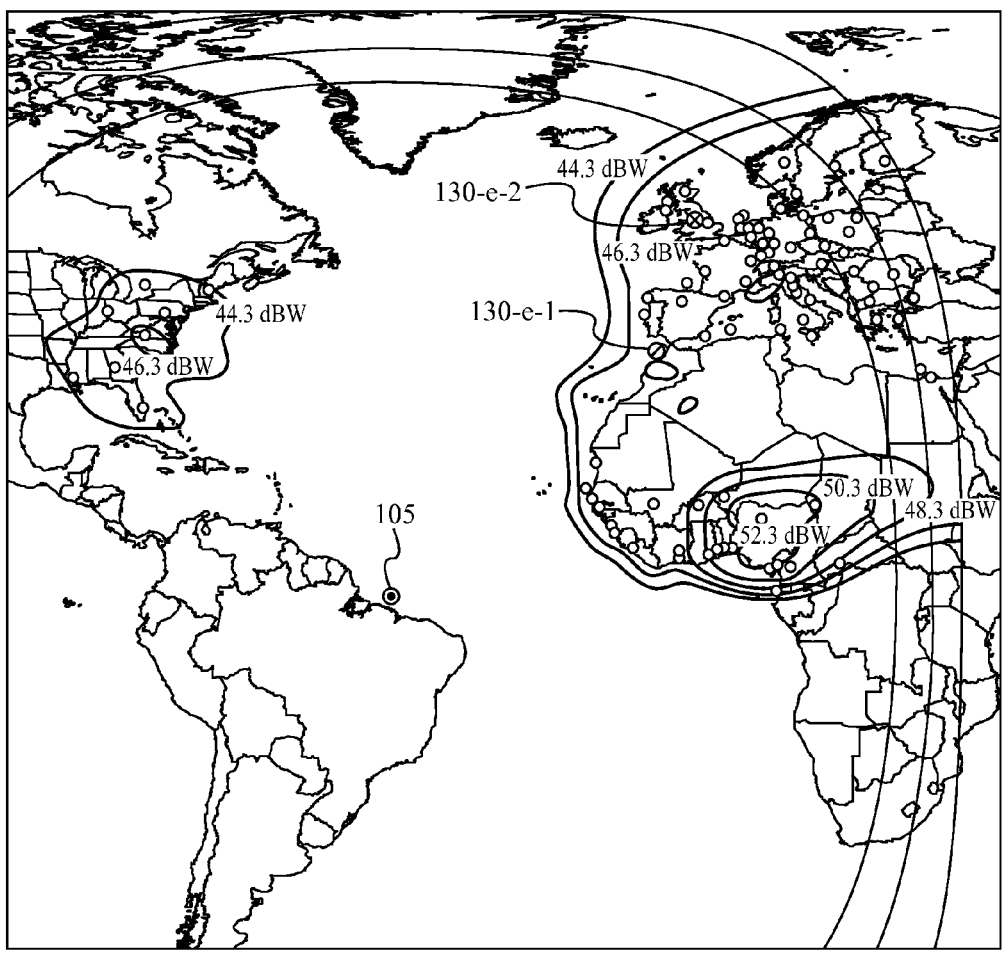
FIG. 14 is a diagram of a satellite communication system involving single terminal ranging for the IRIS network covering part of the United States, Europe, and Africa, in accordance with various embodiments.

|  | CONUS FIG. 13A | | Alaska FIG. 13B | | Latin America FIG. 13C | | Mexico FIG. 13D | | FIG. 14 | |
|---|---|---|---|---|---|---|---|---|---|---|
| Inclination | 0.1° | 12° | 0.1° | 12° | 0.1° | 12° | 0.1° | 12° | 0.1° | 12° |
| Best Ranging ES | 0.07 ms | 3.9 ms | 0.04 ms | 1.75 ms | 0.14 ms | 12.4 ms | 0.05 ms | 3.0 ms | 0.18 ms | 9.8 ms |
| Sample Ranging ES | 0.11 ms | 5.0 ms | 0.05 ms | 1.84 ms | 0.24 ms | 21.9 ms | 0.07 ms | 3.1 ms | 0.20 ms | 15.3 ms |
| No Ranging & Global Coverage | 0.99 ms | 36.0 ms | 0.99 ms | 36.0 ms | 0.99 ms | 36.0 ms | 0.99 ms | 36.0 ms | 0.99 ms | 36.0 ms | where $r_s$ is a radius of the satellite's orbit, which may be 42164.57 km. Other equations may be used to determine the satellite position uncertainty.

A differential range variation between the ranging terminal ($\Delta d_r$) and a user terminal ($\Delta d_u$) from their nominal range may be determined. This may be determined for each terminal in a network. A range error ($\Delta d_{ut}$) for the user terminal may be based on the eight corner satellite positions ($\pm \Delta x_s$, $\pm \Delta y_s$, $\pm \Delta z_s$), which may include an intrinsic range uncertainty $\Delta d$. An intrinsic range uncertainty may take into account factors such as delays caused by terminal equipment and cable connections, for example. In some embodiments, a maximum range error may be determined using an equation such as the following:

$$|\Delta d_{ut}|_{max} = \text{Max}|\Delta d_r - \Delta d_u| + \Delta d.$$

Based on the information determined from at least some of the blocks of method 1100, an acquisition guard time may be determined. In some embodiments, an acquisition guard time may be determined based on the following equation:

$$GT = \frac{4|\Delta d_{ut}|_{max}}{c}.$$

An acquisition guard time for the network may be pre-computed based on terminal locations or a network coverage area, may be updated at preset or varying intervals, or may be set dynamically.

Figure 12:
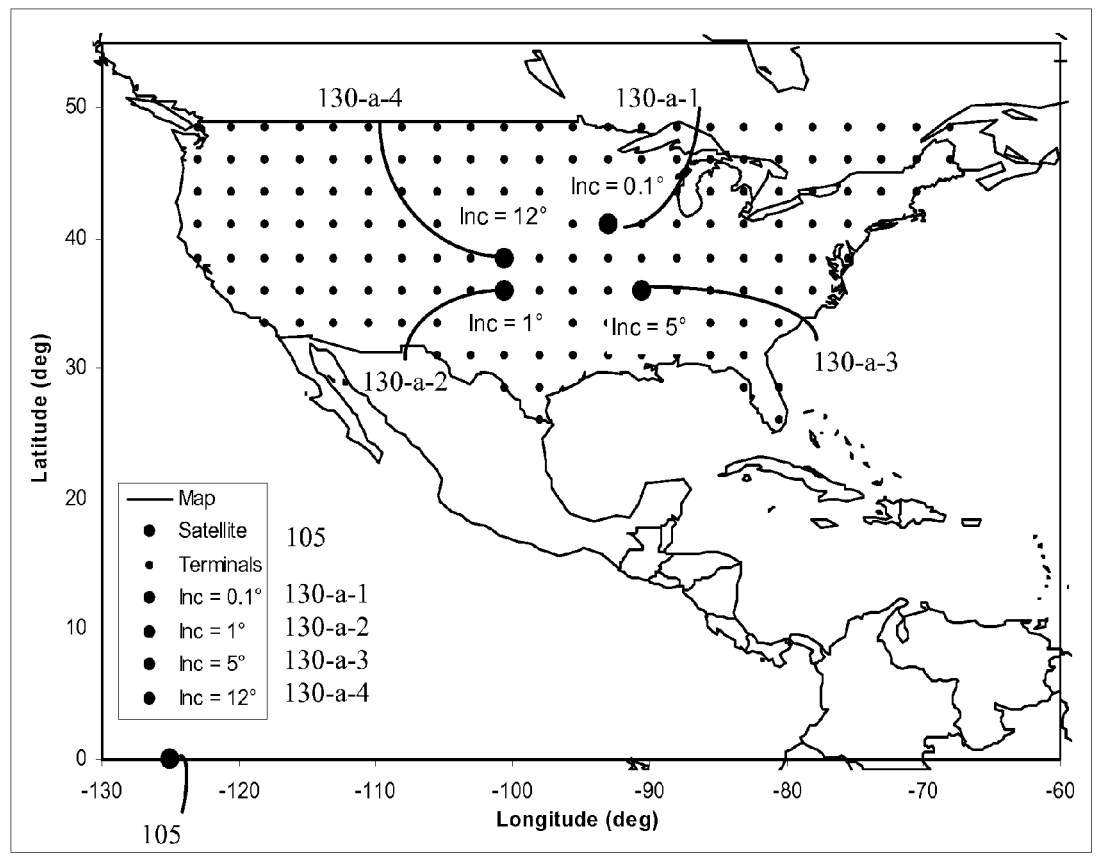
FIG. 12 is a diagram of optimum ranging terminal locations for different inclination angles involving single terminal ranging for a network covering the United States, in accordance with various embodiments.

Different networks that may utilize single terminal ranging are shown in FIGS. 12, 13 A-D, and 14, merely by way of example. Each figure shows positions for terminals in a network, a best ranging terminal to minimize acquisition guard time, a sample ranging terminal, and a satellite. In FIG. 12, satellite 105 is shown along with an array of terminals represented as dots on the geographic map. Best ranging terminal locations for different inclination angles are also shown, including inclination angles 0.1° (130-*a*-1), 1° (130-*a*-2), 5° (130-*a*-3) and 12° (130-*a*-4). In FIGS. 13 A-D, satellites 105-*a*, 105-*b*, 105-*c*, and 105-*d* are shown along with an array of terminals for each figure represented as dots on each geographic map. A best ranging terminal is shown for each figure as 130-*a*-1, 130-*b*-1, 130-*c*-1, and 130-*d*-1. A sample ranging terminal is also shown for each figure at 130-*a*-2, 130-*b*-2, 130-*c*-2, and 130-*d*-2. The best ranging terminal location may be determined by evaluating the maximum guard time for the network terminals for a given inclination. A sample ranging terminal location may be arbitrarily selected to compare an acquisition guard time requirement with that for the best terminal location. Similarly, in FIG. 14, satellite 105 is shown The previous description provides exemplary embodiments only, and is not intended to limit the scope, applicability, or configuration of the disclosure. Rather, the previous description of the exemplary embodiments will provide those skilled in the art with an enabling description for implementing one or more exemplary embodiments. It is understood that various changes may be made in the function and arrangement of elements without departing from the spirit and scope of the invention. Several embodiments were described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the previous description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could have also included additional steps or operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

While detailed descriptions of one or more embodiments have been given above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention.

What is claimed is:

1. A method for determining acquisition control information for terminals in a satellite communications network having a nominal acquisition guard time, the method comprising:
   receiving, from a first terminal in a satellite communication network, a real-time distance metric between a satellite and the first terminal;
   determining a difference between the real-time distance metric and a previously determined distance metric between the satellite and the first terminal;
   updating, based on the difference, a transmit timing control parameter for the first terminal; and
   transmitting, to a second terminal in the satellite communication network, information, based on the difference, for use by the second terminal in transmitting an initial communication to the satellite using an acquisition guard time for the second terminal shorter than the nominal acquisition guard time for the satellite communication network.

2. The method of claim 1, further comprising: transmitting the information to a plurality of terminals in the satellite communication network.

3. The method of claim 1, wherein the information includes the difference.

4. The method of claim 3, further comprising:
   receiving, at the second terminal, the information;
   updating the acquisition guard time for the second terminal based on the information; and
   transmitting, from the second terminal to the satellite, the initial communication using the acquisition guard time for the second terminal, where the acquisition guard time for the second terminal is shorter than the nominal acquisition guard time for the satellite communication network.

5. The method of claim 1, wherein the information comprises: a previously determined distance metric between the satellite and the second terminal and the difference.

6. The method of claim 1, wherein the information comprises: an interval of time between a start of transmit frame (SOTF) and a start of receive frame (SORF) for the second terminal.

7. The method of claim 1, wherein the information comprises: a transmission propagation delay between the second terminal and the satellite.

8. The method of claim 1, wherein the information comprises: a distance between the second terminal and the satellite.

9. The method of claim 1, further comprising: periodically determining an updated difference between an updated real-time distance metric between the satellite and the first terminal, received from the first terminal, and a previously determined distance metric between the satellite and the first terminal with a period based on the orbit inclination of the satellite.

10. The method of claim 1, further comprising: determining an acquisition guard time for the second terminal based on the difference, wherein the acquisition guard time for the second terminal is shorter than the nominal acquisition guard time for the satellite communication network.

11. The method of claim 1, further comprising: determining an updated acquisition guard time for the satellite communication network based on the difference, wherein the updated acquisition guard time for the satellite communication network is shorter than the nominal acquisition guard time for the satellite communication network.

12. The method of claim 1, further comprising: selecting the first terminal as a ranging terminal in order to minimize an updated acquisition guard time for the satellite communication network.

13. The method of claim 1, further comprising: selecting the first terminal as a ranging terminal based on the orbit inclination of the satellite.

14. A satellite communication system comprising:
   a plurality of terminals in a satellite communication network having a nominal acquisition guard time; and
   a control center in communication with at least a subset of the plurality of terminals in the satellite communication network, wherein the control center is configured to:
   receive, from a first terminal of the plurality of terminals in the satellite communication network, a real-time difference metric between a satellite and the first terminal;
   determine a difference between the real-time distance metric and a previously determined distance metric between the satellite and the first terminal;
   update, based on the difference, a transmit timing control parameter for the first terminal; and
   transmit, to a second terminal in the satellite communication network, information, based on the difference, for use by the second terminal in transmitting an initial communication to the satellite using an acquisition guard time for the second terminal shorter than the nominal acquisition guard time for the satellite communication network.

15. The satellite communication system of claim 14, wherein the control center is further configured to: transmit the information to the plurality of terminals in the satellite communication system.

16. The satellite communication system of claim 14, wherein the second terminal is configured to:
   receive the information;
   update an acquisition guard time for the second terminal based on the information; and
   transmit, from the second terminal to the satellite, an initial communication using the acquisition guard time for the second terminal, where the acquisition guard time for the second terminal is shorter than the nominal acquisition guard time for the satellite communication network.

17. The satellite communication system of claim 14, wherein the control center is further configured to: transmit, to the second terminal, a previously determined distance metric between the satellite and the second terminal combined with the difference.

18. The satellite communication system of claim 14, wherein the information represents at least one of:
   an interval of time between a start of transmit frame (SOTF) and a start of receive frame (SORF) for the first terminal;
   a transmission propagation delay for the first terminal; or
   a distance between the first terminal and the determined position of the satellite.

19. The satellite communication system of claim 14, wherein the control center is further configured to: periodically determine an updated difference between an updated real-time distance metric between the satellite and the first terminal, received from the first terminal, and a previously determined distance metric between the satellite and the first terminal with a period based on the orbit inclination of the satellite.

20. The satellite communication system of claim 14, wherein the control center is further configured to: determine an acquisition guard time for the second terminal based on the difference, wherein the acquisition guard time for the second terminal is shorter than the nominal acquisition guard time for the satellite communication network.

21. The satellite communication system of claim 14, wherein the control center is further configured to: determine an updated acquisition guard time for the plurality of terminals based on the difference, wherein the updated acquisition guard time for the plurality of terminals is shorter than the nominal acquisition guard time for the satellite communication network.

22. The satellite communication system of claim 14, wherein the control center is further configured to: select the first terminal as a ranging terminal based on the orbit inclination of the satellite.

23. The satellite communication system of claim 21, wherein the control center is further configured to: select the first terminal as a ranging terminal in order to minimize the updated acquisition guard time for the plurality of terminals.

24. A satellite communication control device for a satellite communication network having a nominal acquisition guard time, the satellite communication control device comprising:
a receiver configured to receive, from a first terminal in the satellite communication Network, a real-time distance metric between a satellite and the first terminal;
a processor configured to determine a difference between the real-time distance metric and a previously determined distance metric between the satellite and the first terminal, and to update, based on the difference, a transmit timing control parameter for the first terminal; and
a transmitter configured to transmit, to a second terminal in the satellite communication network, information, based on the difference, for use by the second terminal in transmitting an initial communication to the satellite using an acquisition guard time for the second terminal shorter than the nominal acquisition guard time for the satellite communication network.

25. The satellite communication control device of claim 24, wherein the transmitter is further configured to: transmit the information to a plurality of terminals in the satellite communication network.

26. The satellite communication control device of claim 24, wherein the transmitter is further configured to: transmit the difference to the second terminal in the satellite communication network.

27. The satellite communication control device of claim 24, wherein the transmitter is further configured to: transmit, to the second terminal, a previously determined distance metric between the satellite and the second terminal combined with the difference.

28. The satellite communication control device of claim 24, wherein the information represents at least one of:
an interval of time between a start of transmit frame (SOTF) and a start of receive frame (SORF) for the first terminal;
a transmission propagation delay for the first terminal; or
a distance between the first terminal and the determined position of the satellite.

29. The satellite communication control device of claim 24, wherein the processor is further configured to: periodically determine an updated difference between an updated real-time distance metric between the satellite and the first terminal, received from the first terminal, and a previously determined distance metric between the satellite and the first terminal with a period based on the orbit inclination of the satellite.

30. The satellite communication control device of claim 24, wherein the processor is further configured to: determine an acquisition guard time for the second terminal based on the difference, wherein the acquisition guard time for the second terminal is shorter than the nominal acquisition guard time for the satellite communication network.

31. The satellite communication control device of claim 24, wherein the processor is further configured to: determine an updated acquisition guard time for the satellite communication network based on the difference, wherein the updated acquisition guard time for the satellite communication network is shorter than the nominal acquisition guard time for the satellite communication network.

32. The satellite communication control device of claim 24, wherein the processor is further configured to: select the first terminal as a ranging terminal for the satellite communication network based on the orbit inclination of the satellite.

33. The satellite communication control device of claim 31, wherein the processor is further configured to: select the first terminal as a ranging terminal in order to minimize the updated acquisition guard time for the satellite communication network.

34. The method of claim 1, wherein the difference is due to movement of the satellite.

35. The satellite communication system of claim 14, wherein the difference is due to movement of the satellite.

* * * * *